(12) United States Patent
Kato et al.

(10) Patent No.: US 12,037,076 B1
(45) Date of Patent: Jul. 16, 2024

(54) HYDRAULIC RESERVOIR AND OPERATING DEVICE OF HUMAN-POWERED VEHICLE

(71) Applicant: SHIMANO INC., Sakai (JP)

(72) Inventors: Yu Kato, Sakai (JP); Kohei Obuchi, Sakai (JP); Takeru Ishihara, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/180,869

(22) Filed: Mar. 9, 2023

(51) Int. Cl.
  *B60T 11/26* (2006.01)
  *B62L 3/02* (2006.01)
  *F15B 1/26* (2006.01)

(52) U.S. Cl.
  CPC ............... *B62L 3/023* (2013.01); *B60T 11/26* (2013.01); *F15B 1/26* (2013.01)

(58) Field of Classification Search
  CPC .......... B60T 11/22; B60T 11/26; B60T 11/30; B62L 3/023; F15B 1/26
  See application file for complete search history.

(56) References Cited

U.S. PATENT DOCUMENTS

| | | | | |
|---|---|---|---|---|
| 5,950,772 A | * | 9/1999 | Buckley | B62L 3/023 188/26 |
| 2008/0053758 A1 | * | 3/2008 | Ruckh | B60T 17/222 188/26 |
| 2008/0060885 A1 | * | 3/2008 | Ruckh | B60T 11/22 188/26 |
| 2014/0174866 A1 | * | 6/2014 | Matsushita | B62K 23/06 188/344 |
| 2015/0001018 A1 | * | 1/2015 | Kariyama | B62K 23/06 188/344 |
| 2017/0088234 A1 | * | 3/2017 | Komada | B62L 3/023 |
| 2020/0049171 A1 | * | 2/2020 | Brioschi | B62L 3/023 |
| 2023/0257062 A1 | * | 8/2023 | Gruse | B60T 11/18 74/473.12 |

* cited by examiner

*Primary Examiner* — Kenneth Bomberg
*Assistant Examiner* — Matthew Wiblin
(74) *Attorney, Agent, or Firm* — MORI & WARD, LLP

(57) ABSTRACT

A hydraulic reservoir of a human-powered vehicle comprises a reservoir structure and a bleeding plug. The reservoir structure includes a reservoir chamber, a bleeding port, and a connecting port. The bleeding port is configured to be in communication with the reservoir chamber. The bleeding port has a bleeding-port inner diameter. The connecting port is configured to connect the reservoir chamber and a hydraulic chamber. The hydraulic chamber is at least partially defined by a piston. The reservoir structure includes an intermediate port through which a fluid is to flow from the connecting port to the bleeding port when bleeding the hydraulic reservoir. The intermediate port has an intermediate-port inner diameter smaller than the bleeding-port inner diameter. The bleeding plug is configured to be attached to the bleeding port.

30 Claims, 16 Drawing Sheets

HYDRAULIC RESERVOIR AND OPERATING DEVICE OF HUMAN-POWERED VEHICLE

BACKGROUND

Technical Field

The present invention relates to a hydraulic reservoir and an operating device of a human-powered vehicle.

Background Information

A human-powered vehicle generally includes a hydraulic device including a reservoir. The hydraulic device includes a hydraulic chamber configured to be filled with a fluid. The reservoir includes an additional chamber configured to absorb a change in volume of the fluid. One of objects of the present disclosure is to improve maintenance of the reservoir.

SUMMARY

In accordance with a first aspect of the present invention, a hydraulic reservoir of a human-powered vehicle comprises a reservoir structure and a bleeding plug. The reservoir structure includes a reservoir chamber, a bleeding port, and a connecting port. The bleeding port is configured to be in communication with the reservoir chamber. The bleeding port has a bleeding-port inner diameter. The connecting port is configured to connect the reservoir chamber and a hydraulic chamber. The hydraulic chamber is at least partially defined by a piston. The reservoir structure includes an intermediate port through which a fluid is to flow from the connecting port to the bleeding port when bleeding the hydraulic reservoir. The intermediate port has an intermediate-port inner diameter smaller than the bleeding-port inner diameter. The bleeding plug is configured to be attached to the bleeding port.

With the operating device according to the first aspect, since the intermediate-port inner diameter is smaller than the bleeding-port inner diameter, the intermediate port can reduce a change in flow of the fluid flowing from the connecting port to the bleeding port via the intermediate port when bleeding the hydraulic reservoir. Thus, it is possible to restrict the fluid from going out of a funnel, improving maintenance of the hydraulic reservoir.

In accordance with a second aspect of the present invention, the operating device according to the first aspect is configured so that the bleeding port has a bleeding-port cross-sectional area. The intermediate port has an intermediate-port cross-sectional area. The intermediate-port cross-sectional area is smaller than the bleeding-port cross-sectional area.

With the operating device according to the second aspect, since the intermediate-port cross-sectional area is smaller than the bleeding-port cross-sectional area, the intermediate port can reliably reduce the change in flow of the fluid flowing from the connecting port to the bleeding port via the intermediate port when bleeding the hydraulic reservoir. Thus, it is possible to reliably improve maintenance of the hydraulic reservoir.

In accordance with a third aspect of the present invention, the operating device according to the first or second aspect is configured so that the reservoir chamber has a longitudinal axis and extends along the longitudinal axis. The intermediate port is at least partially provided between the bleeding port and the connecting port in a longitudinal direction defined along the longitudinal axis.

With the operating device according to the third aspect, it is possible to utilize a space provided between the bleeding port and the connecting port for arranging the intermediate port.

In accordance with a fourth aspect of the present invention, the operating device according to any one of the first to third aspects is configured so that the bleeding port is configured to be in communication with the reservoir chamber via the intermediate port.

With the operating device according to the fourth aspect, it is possible to reliably make the fluid flow between the reservoir chamber and the bleeding port via the intermediate port.

In accordance with a fifth aspect of the present invention, the operating device according to any one of the first to fourth aspects is configured so that the intermediate port includes a first intermediate hole. The first intermediate hole has a first intermediate-hole inner diameter. The first intermediate-hole inner diameter is smaller than the bleeding-port inner diameter.

With the operating device according to the fifth aspect, the first intermediate hole can reduce the change in flow of the fluid flowing from the connecting port to the bleeding port via the intermediate port when bleeding the hydraulic reservoir. Thus, it is possible to restrict the fluid from going out of a funnel, improving maintenance of the hydraulic reservoir.

In accordance with a sixth aspect of the present invention, the operating device according to the fifth aspect is configured so that the intermediate port includes a second intermediate hole spaced apart from the first intermediate hole.

With the operating device according to the sixth aspect, it is possible to utilize the second intermediate hole along with the first intermediate hole to reduce the change in flow of the fluid flowing from the connecting port to the bleeding port via the intermediate port when bleeding the hydraulic reservoir. Thus, it is possible to improve maintenance of the hydraulic reservoir while improving design flexibility of the intermediate port.

In accordance with a seventh aspect of the present invention, the operating device according to the sixth aspect is configured so that the second intermediate hole has a second intermediate-hole inner diameter. The second intermediate-hole inner diameter is smaller than the bleeding-port inner diameter.

With the operating device according to the seventh aspect, the first intermediate hole and the second intermediate hole can reliably reduce the change in flow of the fluid flowing from the connecting port to the bleeding port via the intermediate port when bleeding the hydraulic reservoir. Thus, it is possible to reliably restrict the fluid from going out of a funnel, improving maintenance of the hydraulic reservoir while improving design flexibility of the intermediate port.

In accordance with an eighth aspect of the present invention, the operating device according to the seventh aspect is configured so that the first intermediate-hole inner diameter is different from the second intermediate-hole inner diameter.

With the operating device according to the eighth aspect, it is possible to reliably improve design flexibility of the intermediate port.

In accordance with a ninth aspect of the present invention, the operating device according to the seventh or eighth aspect is configured so that the first intermediate-hole inner diameter is larger than the second intermediate-hole inner diameter.

With the operating device according to the ninth aspect, it is possible to reliably improve design flexibility of the intermediate port.

In accordance with a tenth aspect of the present invention, the operating device according to any one of the sixth to ninth aspects is configured so that the reservoir chamber has a longitudinal axis and extends along the longitudinal axis. The first intermediate hole is at least partially provided closer to the connecting port than the second intermediate hole in a longitudinal direction defined along the longitudinal axis.

With the operating device according to the tenth aspect, it is possible to reliably improve design flexibility of the intermediate port.

In accordance with an eleventh aspect of the present invention, the operating device according to any one of the sixth to tenth aspects is configured so that the reservoir chamber has a longitudinal axis and extends along the longitudinal axis. The bleeding port is at least partially provided between the first intermediate hole and the second intermediate hole in a longitudinal direction defined along the longitudinal axis.

With the operating device according to the eleventh aspect, it is possible to stabilize the flow of the fluid from the first intermediate hole and the second intermediate hole to the bleeding port.

In accordance with a twelfth aspect of the present invention, the operating device according to any one of the first to eleventh aspects is configured so that the bleeding port has a bleeding-port cross-sectional area. The intermediate port includes a first intermediate hole and a second intermediate hole. The first intermediate hole has a first intermediate-hole cross-sectional area. The second intermediate hole has a second intermediate-hole cross-sectional area. A total of the first intermediate-hole cross-sectional area and the second intermediate-hole cross-sectional area is smaller than the bleeding-port cross-sectional area.

With the operating device according to the twelfth aspect, the first intermediate hole and the second intermediate hole can reliably reduce the change in flow of the fluid flowing from the connecting port to the bleeding port via the intermediate port when bleeding the hydraulic reservoir. Thus, it is possible to reliably restrict the fluid from going out of a funnel, improving maintenance of the hydraulic reservoir.

In accordance with a thirteenth aspect of the present invention, the operating device according to any one of the first to twelfth aspects is configured so that the intermediate port has an intermediate-port cross-sectional area. The connecting port has a connecting-port cross-sectional area. The intermediate-port cross-sectional area is smaller than the connecting-port cross-sectional area.

With the operating device according to the thirteenth aspect, the intermediate port can reliably reduce the change in flow of the fluid flowing from the connecting port to the bleeding port via the intermediate port when bleeding the hydraulic reservoir. Thus, it is possible to reliably restrict the fluid from going out of a funnel, improving maintenance of the hydraulic reservoir.

In accordance with a fourteenth aspect of the present invention, the operating device according to the thirteenth aspect is configured so that the connecting port includes a first connecting port. The first connecting port has a first connecting-port cross-sectional area. The intermediate-port cross-sectional area is smaller than the first connecting-port cross-sectional area.

With the operating device according to the fourteenth aspect, the intermediate port can reliably reduce the change in flow of the fluid flowing from the first connecting port to the bleeding port via the intermediate port when bleeding the hydraulic reservoir. Thus, it is possible to reliably restrict the fluid from going out of a funnel, improving maintenance of the hydraulic reservoir.

In accordance with a fifteenth aspect of the present invention, the operating device according to the fourteenth aspect is configured so that the connecting port includes a second connecting port spaced apart from the first connecting port.

With the operating device according to the fifteenth aspect, the first connecting port and the second connecting port enable the fluid to flow smoothly between the hydraulic chamber and the reservoir chamber. Thus, it is possible to improve maintenance of the hydraulic reservoir while improving design flexibility of the connecting port.

In accordance with a sixteenth aspect of the present invention, the operating device according to the fifteenth aspect is configured so that the second connecting port has a connecting-port inner diameter. The intermediate-port inner diameter is smaller than the connecting-port inner diameter.

With the operating device according to the sixteenth aspect, the intermediate port can reliably reduce the change in flow of the fluid flowing from the second connecting port to the bleeding port via the intermediate port when bleeding the hydraulic reservoir. Thus, it is possible to reliably restrict the fluid from going out of a funnel, improving maintenance of the hydraulic reservoir.

In accordance with a seventeenth aspect of the present invention, the operating device according to the fifteenth or sixteenth aspect is configured so that the second connecting port has a second connecting-port cross-sectional area. The intermediate-port cross-sectional area is smaller than the second connecting-port cross-sectional area.

With the operating device according to the seventeenth aspect, the intermediate port can reliably reduce the change in flow of the fluid flowing from the second connecting port to the bleeding port via the intermediate port when bleeding the hydraulic reservoir. Thus, it is possible to reliably restrict the fluid from going out of a funnel, improving maintenance of the hydraulic reservoir.

In accordance with an eighteenth aspect of the present invention, the operating device according to any one of the fifteenth to seventeenth aspects is configured so that the reservoir chamber has a longitudinal axis and extends along the longitudinal axis. The first connecting port is at least partially provided closer to the intermediate port than the second connecting port in a longitudinal direction defined along the longitudinal axis.

With the operating device according to the eighteenth aspect, it is possible to reliably improve design flexibility of the connecting port.

In accordance with a nineteenth aspect of the present invention, the operating device according to any one of the first to eighteenth aspects is configured so that the reservoir structure includes a reservoir housing, a lid, and a diaphragm. The reservoir housing includes a reservoir space having an end opening. The lid is configured to be attached to the reservoir housing to close the end opening of the reservoir space. The diaphragm is configured to be attached to the lid. The diaphragm is configured to be provided in the reservoir space in an assembled state where the lid is attached to the reservoir housing and where the diaphragm is attached to the lid. The reservoir housing and the diaphragm define the reservoir chamber in the reservoir space. The reservoir housing includes the bleeding port, the connecting port, and the intermediate port.

With the operating device according to the nineteenth aspect, the diaphragm can absorb a change in volume of the fluid caused by a change in situation such as temperature.

In accordance with a twentieth aspect of the present invention, the operating device according to the nineteenth aspect is configured so that the reservoir housing includes a reservoir body and an attachment body. The reservoir body includes the bleeding port and the connecting port. The attachment body is configured to be attached to the reservoir body. The attachment body includes the intermediate port.

With the operating device according to the twentieth aspect, the attachment body can improve design flexibility of the intermediate port.

In accordance with a twenty-first aspect of the present invention, the operating device according to the twentieth aspect is configured so that the attachment body is configured to be at least partially provided in the reservoir space.

With the operating device according to the twenty-first aspect, it is possible to utilize the reservoir space for arranging the attachment body.

In accordance with a twenty-second aspect of the present invention, the operating device according to the twentieth or twenty-first aspect is configured so that the attachment body includes a first attachment portion. The first attachment portion includes the intermediate port and an intermediate space. The intermediate port is in communication with the intermediate space.

With the operating device according to the twenty-second aspect, it is possible to utilize the intermediate port and the intermediate space for flowing the fluid between the reservoir chamber and the bleeding port.

In accordance with a twenty-third aspect of the present invention, the operating device according to the twenty-second aspect is configured so that the attachment body includes a protruding part provided in the intermediate space. The protruding part is configured to be at least partially provided in an inlet opening of a funnel in a state where the funnel is attached to the bleeding port instead of the bleeding plug.

With the operating device according to the twenty-third aspect, the protruding part can reduce a cross-sectional area of a passageway defined between the protruding part and an end part of the funnel. Thus, it is possible to reliably reduce the change in flow of the fluid flowing from the intermediate port to the bleeding port.

In accordance with a twenty-fourth aspect of the present invention, the operating device according to the twenty-second or twenty-third aspect is configured so that the intermediate space is configured to be at least partially provided between the bleeding port and the intermediate port in an attachment state where the attachment body is attached to the reservoir body.

With the operating device according to the twenty-fourth aspect, it is possible to reduce, in the intermediate space, a flow velocity of the fluid flowing from the reservoir chamber to the bleeding port via the intermediate port.

In accordance with a twenty-fifth aspect of the present invention, the operating device according to the twenty-fourth aspect is configured so that the reservoir body includes an inner peripheral surface at least partially defining the reservoir space. The attachment body includes a second attachment portion. The second attachment portion extends from the first attachment portion along the inner peripheral surface in the attachment state.

With the operating device according to the twenty-fifth aspect, it is possible to attach the attachment body to the inner peripheral surface of the reservoir body using the second attachment portion.

In accordance with a twenty-sixth aspect of the present invention, the operating device according to the twenty-fifth aspect is configured so that the first attachment portion and the second attachment portion define an annular shape.

With the operating device according to the twenty-sixth aspect, it is possible to fit the attachment body to the inner peripheral surface of the reservoir body.

In accordance with a twenty-seventh aspect of the present invention, the operating device according to the twenty-fifth or twenty-sixth aspect is configured so that the second attachment portion is deformable to bias the first attachment portion toward the bleeding port in the attachment state.

With the operating device according to the twenty-seventh aspect, it is possible to fit the attachment body to the inner peripheral surface of the reservoir body using deformation of the second attachment portion.

In accordance with a twenty-eighth aspect of the present invention, the operating device according to any one of the twenty-fifth to twenty-seventh aspects is configured so that the attachment body has an outer diameter in a free state. The second attachment portion is deformable to decrease the outer diameter in the attachment state.

With the operating device according to the twenty-eighth aspect, it is possible to fit the attachment body to the inner peripheral surface of the reservoir body using deformation of the second attachment portion.

In accordance with a twenty-ninth aspect of the present invention, the operating device according to any one of the twenty-fifth to twenty-eighth aspect is configured so that the attachment body includes a positioning portion configured to position the attachment body relative to the reservoir body in the attachment state.

With the operating device according to the twenty-ninth aspect, it is possible to reliably position the intermediate port relative to the bleeding port using the positioning portion.

In accordance with a thirtieth aspect of the present invention, the operating device according to the twenty-ninth aspect is configured so that the reservoir chamber has a longitudinal axis and extends along the longitudinal axis. The positioning portion includes a positioning protrusion protruding radially from the second attachment portion with respect to the longitudinal axis in the attachment state.

With the operating device according to the thirtieth aspect, it is possible to reliably position the intermediate port relative to the bleeding port using the positioning protrusion.

In accordance with a thirty-first aspect of the present invention, the operating device according to the thirtieth aspect is configured so that the attachment body includes a first axial end and a second axial end. The attachment body extends between the first axial end and the second axial end along the longitudinal axis in the attachment state. A first distance is defined between the first axial end and the positioning protrusion. A second distance is defined between the second axial end and the positioning protrusion. The second distance is different from the first distance.

With the operating device according to the thirty-first aspect, the first distance and the second distance can restrict the attachment body from being attached to the reservoir body in a wrong orientation.

In accordance with a thirty-second aspect of the present invention, an operating device of a human-powered vehicle comprises a base member, an operating member, a piston, and the hydraulic reservoir according to any one of the first to thirty-first aspects. The base member includes a hole. The operating member is movably coupled to the base member. The piston is movably provided in the hole. The piston is coupled to the operating member to be moved relative to the base member in response to a movement of the operating member. The base member and the piston define a hydraulic chamber in the hole. The hydraulic reservoir is attached to the base member. The reservoir chamber of the hydraulic reservoir is configured to be in communication with the hydraulic chamber via the connecting port.

With the operating device according to the thirty-second aspect, it is possible to apply the hydraulic reservoir to the operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
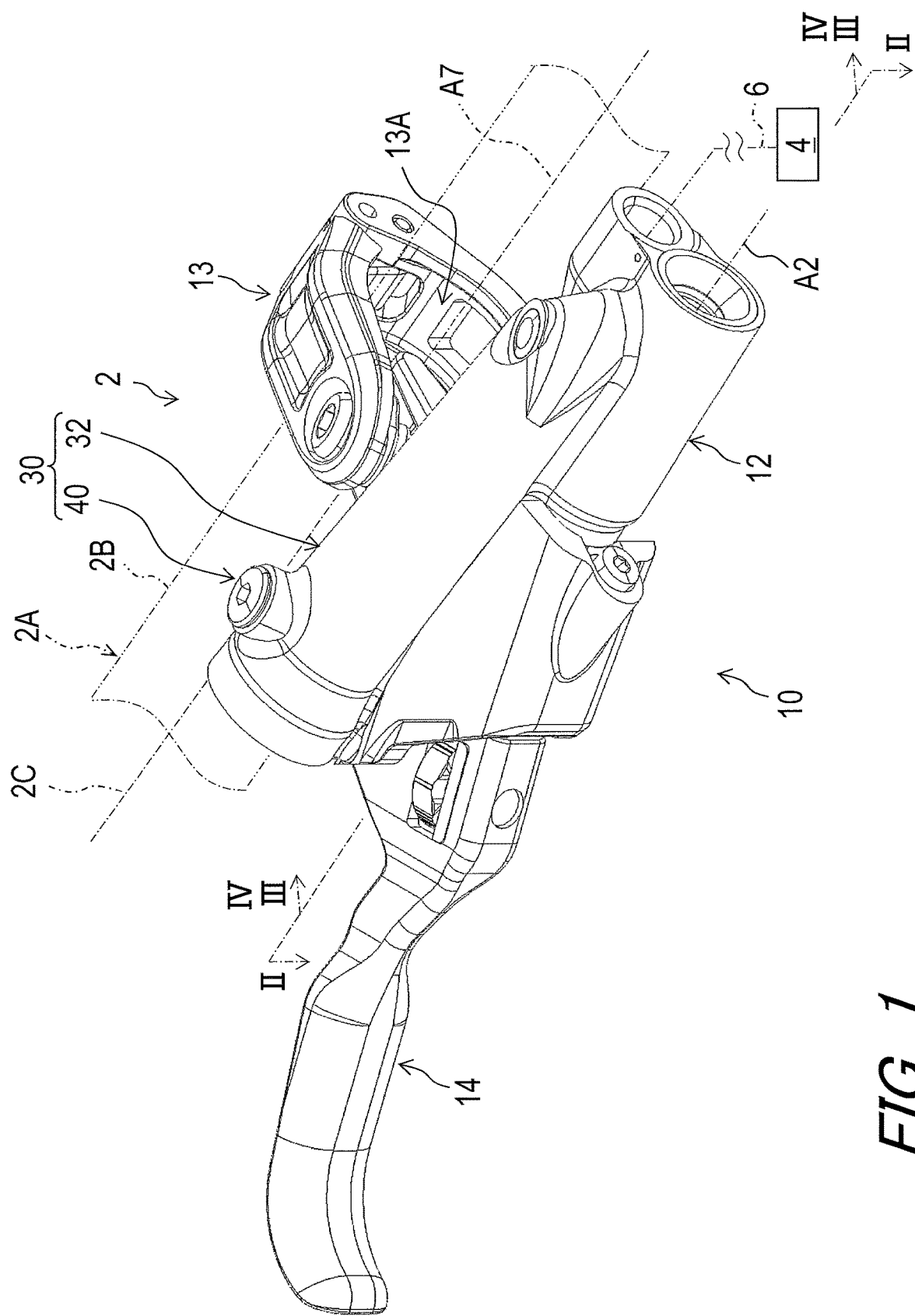
FIG. 1 is a perspective view of an operating device including a hydraulic reservoir in accordance with an embodiment.

The embodiments will now be described with reference to the accompanying drawings, wherein like reference numerals designate corresponding or identical elements throughout the various drawings.

As seen in FIG. 1, an operating device 10 of a human-powered vehicle 2 comprises a base member 12. The base member 12 is configured to be mounted to the human-powered vehicle 2. The operating device 10 is configured to be connected to an operated device 4 via a hydraulic hose 6.

In the present embodiment, the base member 12 is configured to be mounted to a vehicle body 2A of the human-powered vehicle 2. The base member 12 is configured to be mounted to a tubular part 2B (e.g., a handlebar) of the vehicle body 2A of the human-powered vehicle 2. The tubular part 2B has a longitudinal center axis 2C. The tubular part 2B extends along the longitudinal center axis 2C. However, the base member 12 can be mounted to other parts of the human-powered vehicle 2 if needed and/or desired.

In the present application, the term "human-powered vehicle" includes a vehicle to travel with a motive power including at least a human power of a user (i.e., rider) who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source (e.g., an internal-combustion engine, an electric motor) as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the operating device 10 or other components, should be interpreted relative to the human-powered vehicle 2 equipped with the operating device 10 or other components as used in an upright riding position on a horizontal surface.

In the present embodiment, the operating device 10 is a right-hand operating device configured to be operated by a user's right hand. However, structures of the operating device 10 can be applied to a left-hand operating device if needed and/or desired.

The base member 12 includes a mounting structure 13. The mounting structure 13 defines a mounting axis A7 and is configured to couple the mounting structure 13 to the tubular part 2B of the human-powered vehicle 2. The mounting structure 13 includes a mounting opening 13A through which the tubular part 2B of the human-powered vehicle 2 is to extend. The mounting axis A7 extends along the longitudinal center axis 2C of the tubular part 2B in a state where the mounting structure 13 couples the base member 12 and the tubular part 2B of the human-powered vehicle 2.

Figure 2:
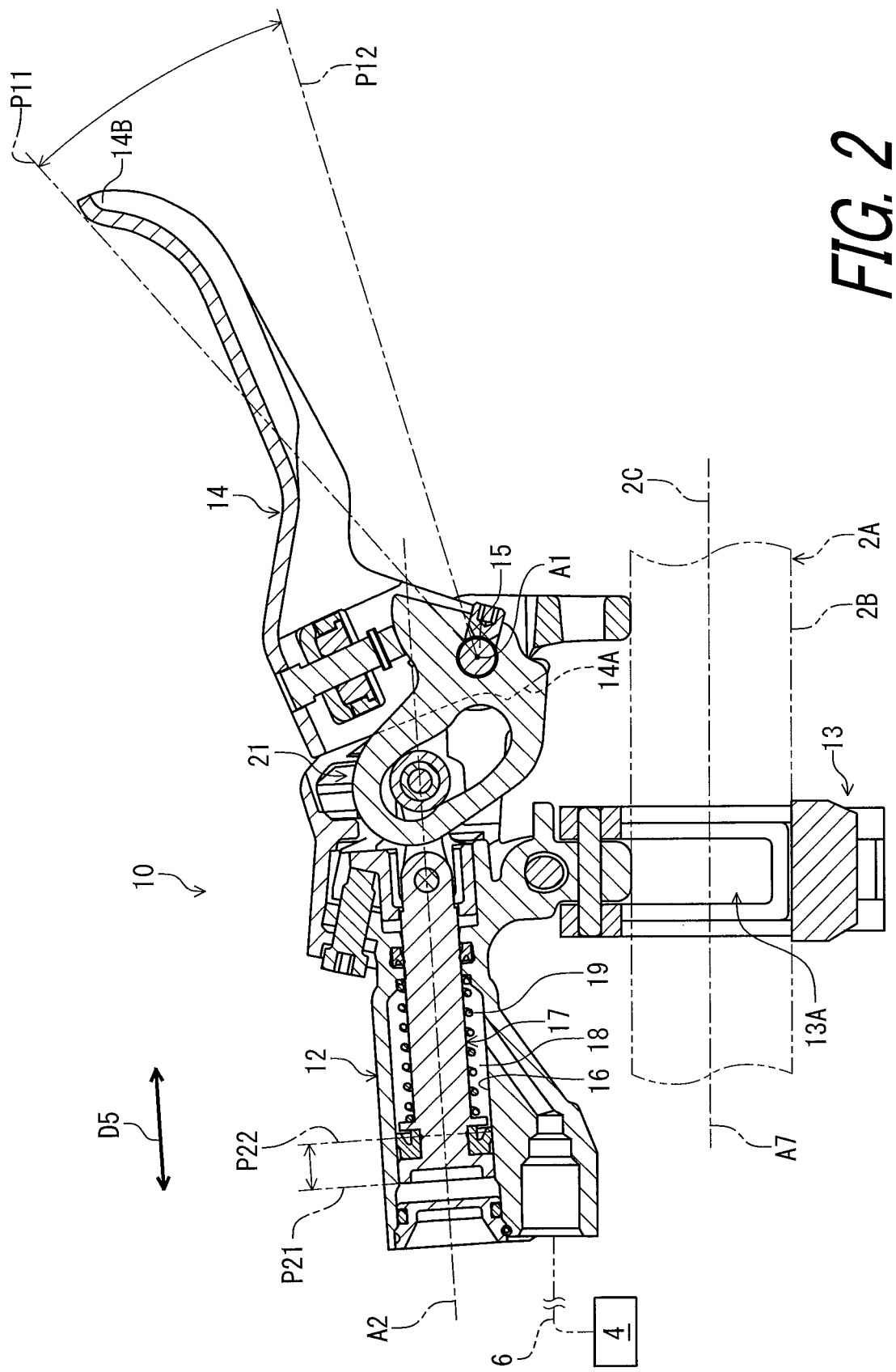
FIG. 2 is a cross-sectional view of the operating device taken along line II-II of FIG. 1.

As seen in FIG. 2, the operating device 10 of the human-powered vehicle 2 comprises an operating member 14. The operating member 14 is movably coupled to the base member 12. The operating member 14 is pivotally coupled to the base member 12 about a pivot axis A1. The operating member 14 is pivotable relative to the base member 12 about the pivot axis A1 from a rest position P11 to an operated position P12 in response to a user operation.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform an operation of a device such as the operated device 4.

The operating member 14 includes a proximal end 14A and a distal end 14B and extends between the proximal end 14A and the distal end 14B. The proximal end 14A is pivotally coupled to the base member 12 about the pivot axis A1. Each of the rest position P11 and the operated position P12 is defined by the distal end 14B. However, each of the rest position P11 and the operated position P12 can be defined by another part of the operating member 14 if needed and/or desired.

The operating device 10 further comprises a pivot shaft 15. The pivot shaft 15 defines the pivot axis A1. The operating member 14 is pivotally coupled to the base member 12 about the pivot axis A1 via the pivot shaft 15.

The base member 12 includes a hole 16. The hole 16 has a hole center axis A2 and extends along the hole center axis A2. The operating device 10 of the human-powered vehicle 2 comprises a piston 17. The piston 17 is movably provided in the hole 16. The piston 17 is movable relative to the base member 12 along the hole center axis A2. The piston 17 is movable relative to the base member 12 in a movement direction D5 parallel to the hole center axis A2. The piston 17 is coupled to the operating member to be moved relative to the base member 12 in response to a movement of the operating member 14. The piston 17 is coupled to the operating member 14 to be moved relative to the base member 12 in response to a pivotal movement of the operating member 14 relative to the base member 12.

The piston 17 is movable relative to the base member 12 from an initial position P21 to an actuated position P22 in response to the pivotal movement of the operating member 14 relative to the base member 12 from the rest position P11 to the operated position P12. The piston 17 is in the initial position P21 in a rest state where the operating member 14 is in the rest position P11. The piston 17 is in the actuated position P22 in an operated state where the operating member 14 is in the operated position P12.

In the present embodiment, the piston 17 is configured to be pulled in response to the pivotal movement of the operating member 14 from the rest position P11 to the operated position P12. However, the piston 17 can be configured to be pushed in response to the pivotal movement of the operating member 14 from the rest position P11 to the operated position P12 if needed and/or desired.

The hydraulic chamber 18 is at least partially defined by the piston 17. The base member 12 and the piston 17 define a hydraulic chamber 18 in the hole 16. The hydraulic chamber 18 is configured to be filled with a fluid. The hydraulic chamber 18 is configured to be in communication with an additional hydraulic chamber of the operated device 4 via the hydraulic hose 6. The operating device 10 includes a piston biasing member 19. The piston biasing member 19 is provided in the hydraulic chamber 18 to bias the piston 17 toward the initial position P21.

As seen in FIG. 2, the operating device 10 further comprises a coupling structure 21. The coupling structure 21 couples the piston 17 and the operating member 14 to transmit the pivotal movement of the operating member 14 to the piston 17. The structures of the coupling structure 21 has been known in the human-powered vehicle field. Thus, they will not be described in detail here for the sake of brevity.

Figure 3:
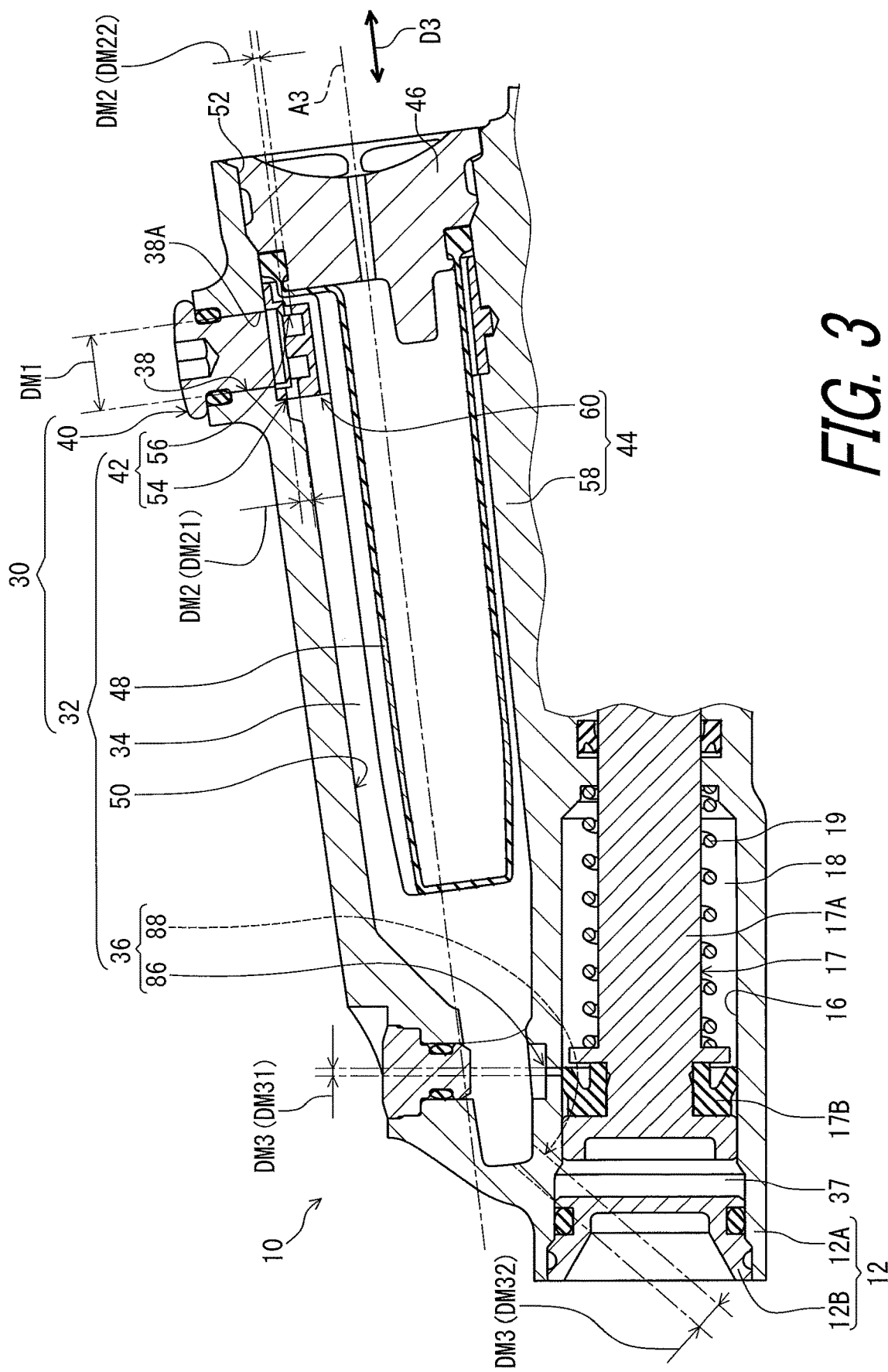
FIG. 3 is a cross-sectional view of the operating device taken along line of FIG. 1.

As seen in FIG. 3, the operating device 10 of the human-powered vehicle 2 comprises a hydraulic reservoir 30. The hydraulic reservoir 30 is attached to the base member 12. The hydraulic reservoir 30 of the human-powered vehicle 2 comprises a reservoir structure 32. The reservoir structure 32 includes a reservoir chamber 34 and a connecting port 36. The reservoir chamber 34 is configured to be filled with the fluid. The connecting port 36 is configured to connect the reservoir chamber 34 and the hydraulic chamber 18. The reservoir chamber 34 of the hydraulic reservoir 30 is configured to be in communication with the hydraulic chamber 18 via the connecting port 36.

An additional chamber 37 is defined by the base member 12 and the piston 17. The base member 12 includes a base body 12A and a closing member 12B. The base body 12A includes the hole 16. The closing member 12B is at least partially provided in the hole 16 to close an end of the hole 16. The additional chamber 37 is defined by the base body 12A, the closing member 12B, and the piston 17. The piston 17 includes a piston body 17A and a seal ring 17B. The seal ring 17B is attached to the piston body 17A. The seal ring 17B is provided between the hydraulic chamber 18 and the additional chamber 37. The reservoir chamber 34 is configured to be in communication with the additional chamber 37 via the connecting port 36.

The reservoir structure 32 includes a bleeding port 38. The bleeding port 38 is configured to be in communication with the reservoir chamber 34. The hydraulic reservoir 30 of the human-powered vehicle 2 comprises a bleeding plug 40. The bleeding plug 40 is configured to be attached to the bleeding port 38. The bleeding port 38 includes a threaded hole 38A. The bleeding plug 40 is configured to be threadedly engaged with the threaded hole 38A.

Figure 4:
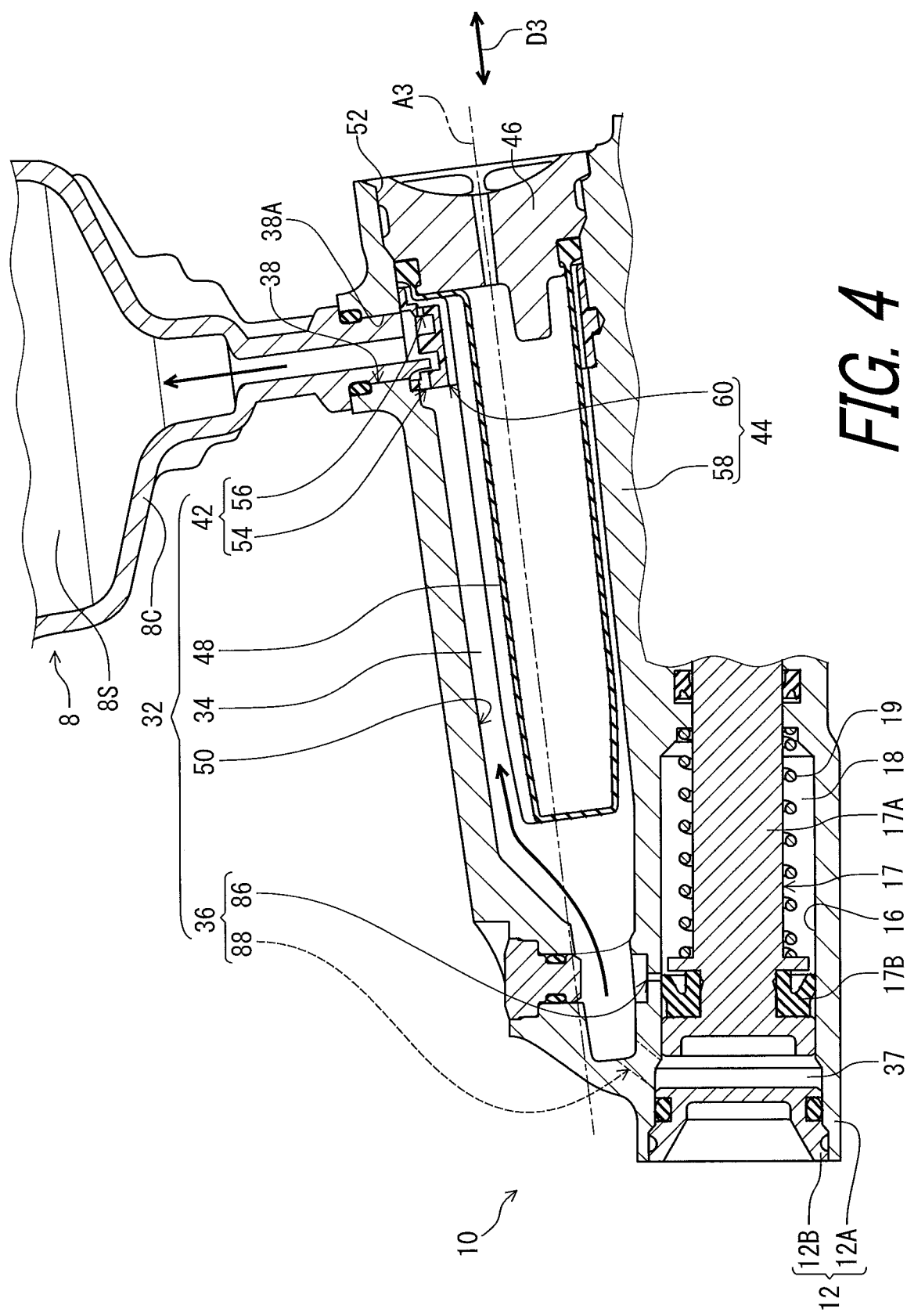
FIG. 4 is a cross-sectional view of the operating device taken along line IV-IV of FIG. 1, with a funnel.

As seen in FIG. 4, the bleeding port 38 is configured to be connected with a funnel 8 when bleeding the hydraulic reservoir 30. The funnel 8 is configured to be threadedly engaged with the threaded hole 38A of the bleeding port 38. The fluid flows from the hydraulic chamber 18 to an internal space 8S of the funnel 8 via the connecting port 36, the reservoir chamber 34, and the bleeding port 38 while bleeding the hydraulic reservoir 30.

To reduce a change in flow of the fluid flowing from the hydraulic chamber 18 to the funnel 8 while bleeding, the reservoir structure 32 includes an intermediate port 42 through which the fluid is to flow from the connecting port 36 to the bleeding port 38 when bleeding the hydraulic reservoir 30. The bleeding port 38 is configured to be in communication with the reservoir chamber 34 via the intermediate port 42.

The reservoir chamber 34 has a longitudinal axis A3 and extends along the longitudinal axis A3. The intermediate port 42 is at least partially provided between the bleeding port 38 and the connecting port 36 in a longitudinal direction D3 defined along the longitudinal axis A3. In the present embodiment, the intermediate port 42 is partially provided between the bleeding port 38 and the connecting port 36 in the longitudinal direction D3. However, the intermediate port 42 can be entirely provided between the bleeding port 38 and the connecting port 36 in the longitudinal direction D3 if needed and/or desired.

As seen in FIG. 3, the reservoir structure 32 includes a reservoir housing 44, a lid 46, and a diaphragm 48. The reservoir housing 44 includes a reservoir space 50 having an end opening 52. The lid 46 is configured to be attached to the reservoir housing 44 to close the end opening 52 of the reservoir space 50. The diaphragm 48 is configured to be attached to the lid 46. The diaphragm 48 is configured to be provided in the reservoir space 50 in an assembled state where the lid 46 is attached to the reservoir housing 44 and where the diaphragm 48 is attached to the lid 46. The reservoir housing 44 and the diaphragm 48 define the reservoir chamber 34 in the reservoir space 50. The reservoir housing 44 includes the bleeding port 38, the connecting port 36, and the intermediate port 42.

The intermediate port 42 includes a first intermediate hole 54. The intermediate port 42 includes a second intermediate hole 56. The second intermediate hole 56 is spaced apart from the first intermediate hole 54. The second intermediate hole 56 is separately provided from the first intermediate hole 54. One of the first intermediate hole 54 and the second intermediate hole 56 can be omitted from the intermediate port 42 if needed and/or desired. The first intermediate hole 54 can be provided in a position different from the position illustrated in FIG. 3 if needed and/or desired. The second intermediate hole 56 can be provided in a position different from the position illustrated in FIG. 3 if needed and/or desired.

The first intermediate hole 54 is at least partially provided closer to the connecting port 36 than the second intermediate hole 56 in a longitudinal direction D3 defined along the longitudinal axis A3. The bleeding port 38 is at least partially provided between the first intermediate hole 54 and the second intermediate hole 56 in the longitudinal direction D3 defined along the longitudinal axis A3.

In the present embodiment, the first intermediate hole 54 is entirely provided closer to the connecting port 36 than the second intermediate hole 56 in the longitudinal direction D3. The bleeding port 38 is partially provided between the first intermediate hole 54 and the second intermediate hole 56 in the longitudinal direction D3. However, the first intermediate hole 54 can be partially provided closer to the connecting port 36 than the second intermediate hole 56 in the longitudinal direction D3 if needed and/or desired. The bleeding port 38 can be entirely provided between the first intermediate hole 54 and the second intermediate hole 56 in the longitudinal direction D3 if needed and/or desired.

Figure 5:
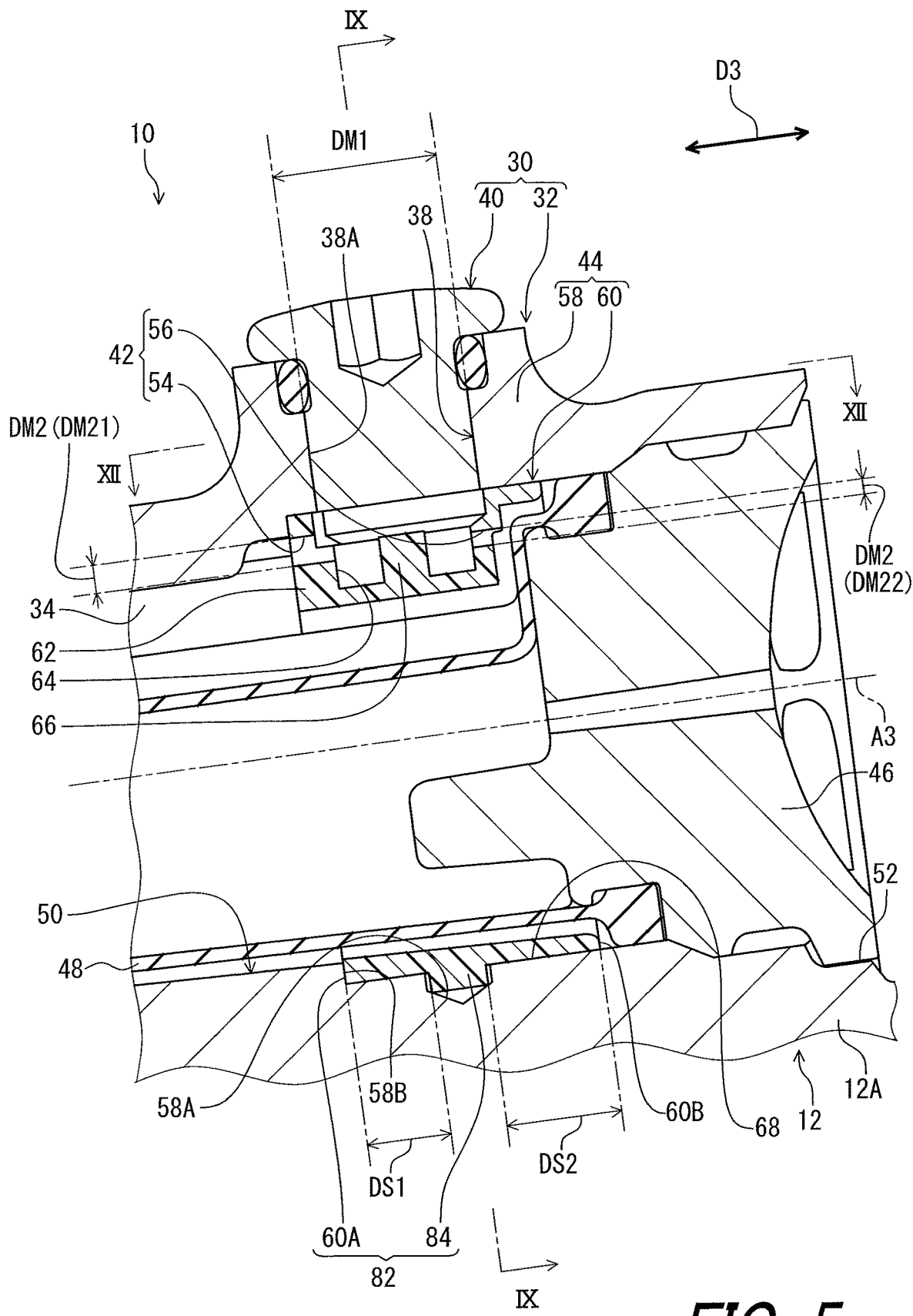
FIG. 5 is a partial cross-sectional view of the operating device illustrated in FIG. 3.

As seen in FIG. 5, the reservoir housing 44 includes a reservoir body 58 and an attachment body 60. The reservoir body 58 includes the bleeding port 38 and the connecting port 36. The attachment body 60 is configured to be attached to the reservoir body 58. The attachment body 60 includes the intermediate port 42. The attachment body 60 is a separate member from the reservoir body 58. The attachment body 60 is configured to be at least partially provided in the reservoir space 50. In the present embodiment, the reservoir body 58 is integrally provided with the base body 12A of the base member 12 as a one-piece unitary member. The attachment body 60 is configured to be entirely provided in the reservoir space 50. However, the attachment body 60 can be configured to be partially provided in the reservoir space 50 if needed and/or desired. The attachment body 60 can be integrally provided with the reservoir body 58 as a one-piece unitary member if needed and/or desired. The reservoir body 58 can be a separate member from the base body 12A if needed and/or desired.

Figure 6:
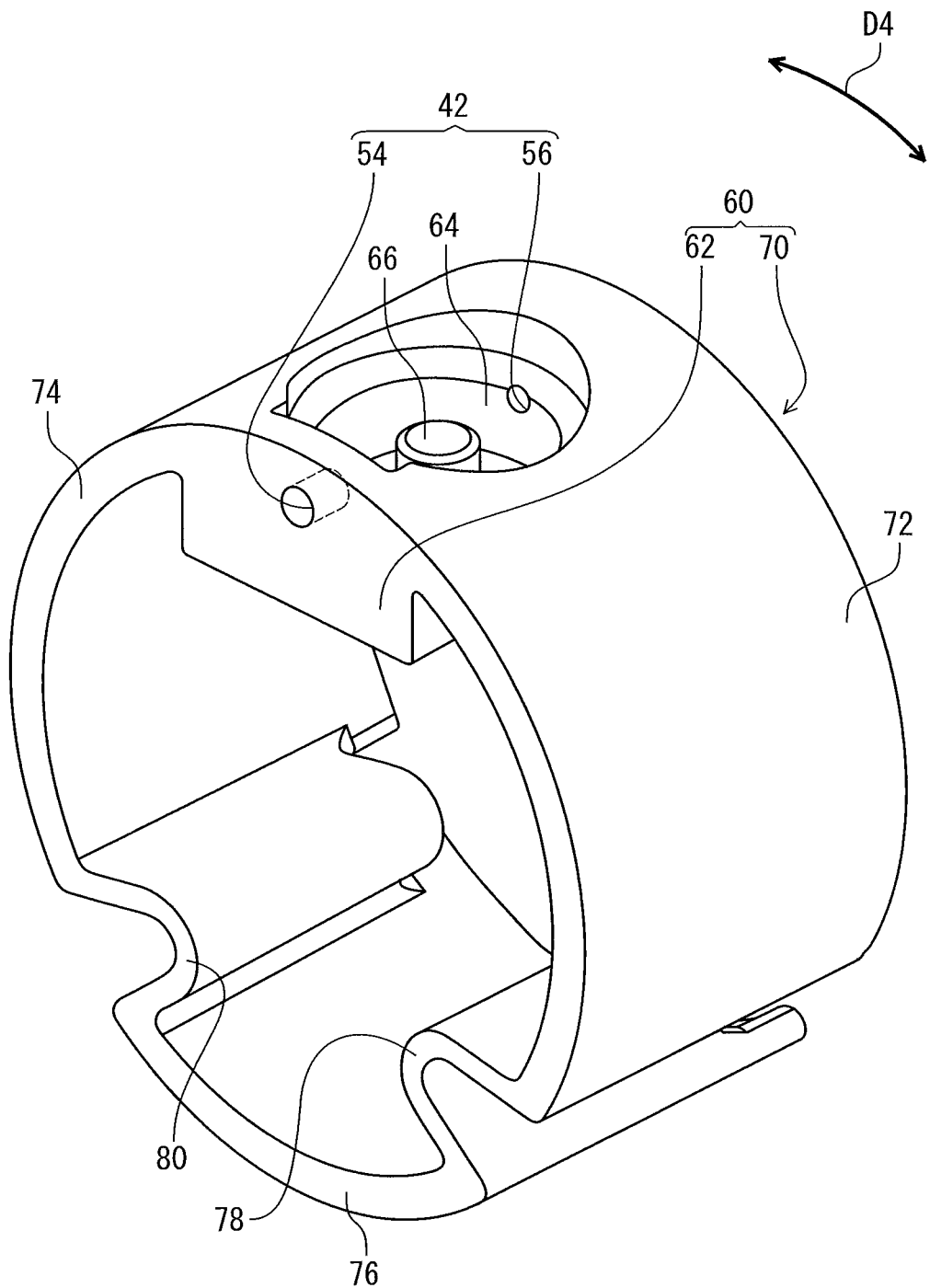
FIG. 6 is a perspective view of an attachment body of the hydraulic reservoir device illustrated in FIG. 1.

As seen in FIG. 6, the attachment body 60 includes a first attachment portion 62. The first attachment portion 62 includes the intermediate port 42 and an intermediate space 64. The intermediate port 42 is in communication with the intermediate space 64. The first attachment portion 62 includes the first intermediate hole 54 and the second intermediate hole 56. The first intermediate hole 54 is in communication with the intermediate space 64. The second intermediate hole 56 is in communication with the intermediate space 64.

As seen in FIG. 5, the intermediate space 64 is configured to be at least partially provided between the bleeding port 38 and the intermediate port 42 in an attachment state where the attachment body 60 is attached to the reservoir body 58. In the present embodiment, the intermediate space 64 is configured to be partially provided between the bleeding port 38 and the intermediate port 42 in the attachment state. However, the intermediate space 64 can be configured to be entirely provided between the bleeding port 38 and the intermediate port 42 in the attachment state if needed and/or desired.

The attachment body 60 includes a protruding part 66 provided in the intermediate space 64. The protruding part 66 protrudes from the first attachment portion 62. The protruding part 66 protrudes radially outwardly from the first attachment portion 62 with respect to the longitudinal axis A3. The protruding part 66 protrudes from the first attachment portion 62 toward the bleeding port 38 in the attachment state.

Figure 7:
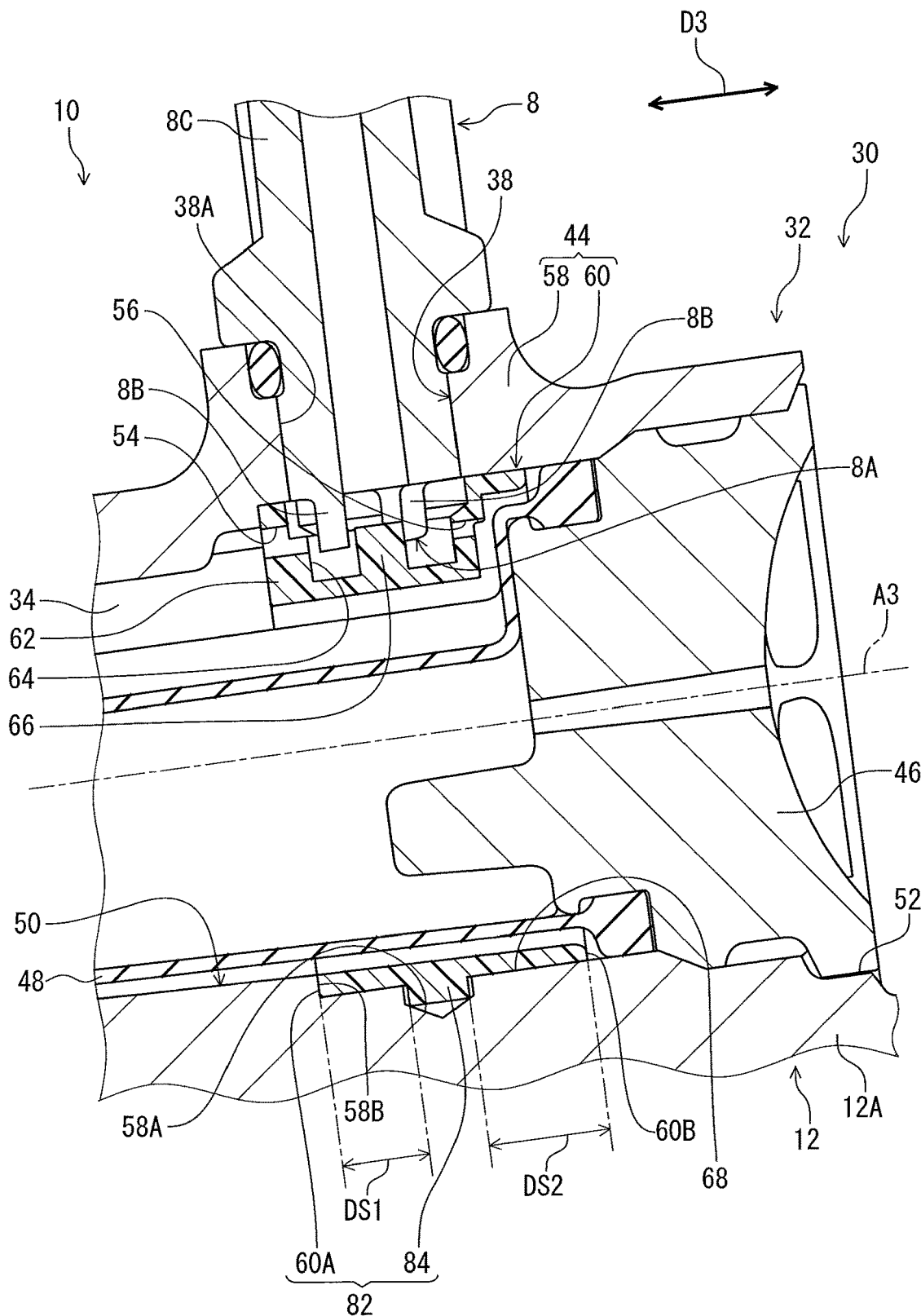
FIG. 7 is a partial cross-sectional view of the operating device illustrated in FIG. 4.

As seen in FIG. 7, the protruding part 66 is configured to be at least partially provided in an inlet opening 8A of the funnel 8 in a state where the funnel 8 is attached to the bleeding port 38 instead of the bleeding plug 40. In the present embodiment, the protruding part 66 is configured to be partially provided in the inlet opening 8A of the funnel 8 in the state where the funnel 8 is attached to the bleeding port 38. However, the protruding part 66 can be configured to be entirely provided in the inlet opening 8A of the funnel 8 in the state where the funnel 8 is attached to the bleeding port 38 if needed and/or desired.

Figure 8:
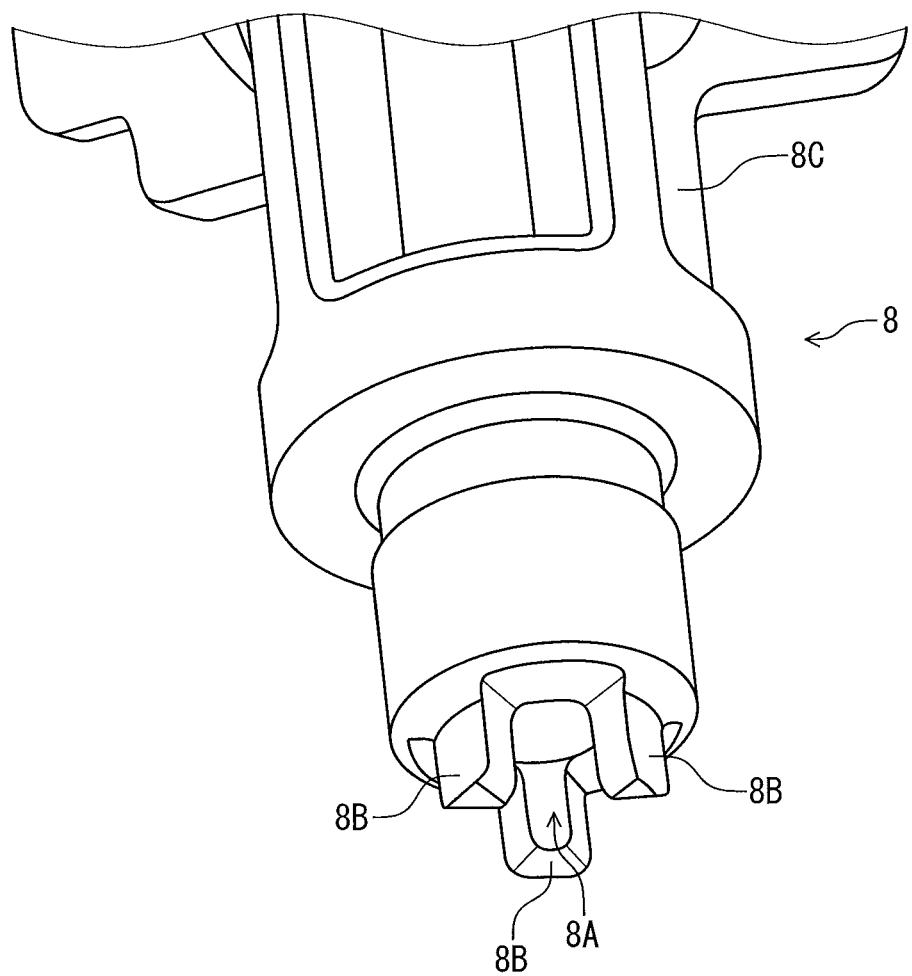
FIG. 8 is a partial perspective view of the funnel illustrated in FIG. 4.

As seen in FIG. 8, the funnel 8 includes a funnel body 8C and at least two inlet protrusions 8B. The at least two inlet protrusions 8B define the inlet opening 8A. The at least two inlet protrusions 8B are circumferentially arranged. The at least two inlet protrusions 8B are circumferentially arranged at regular intervals.

Figure 9:
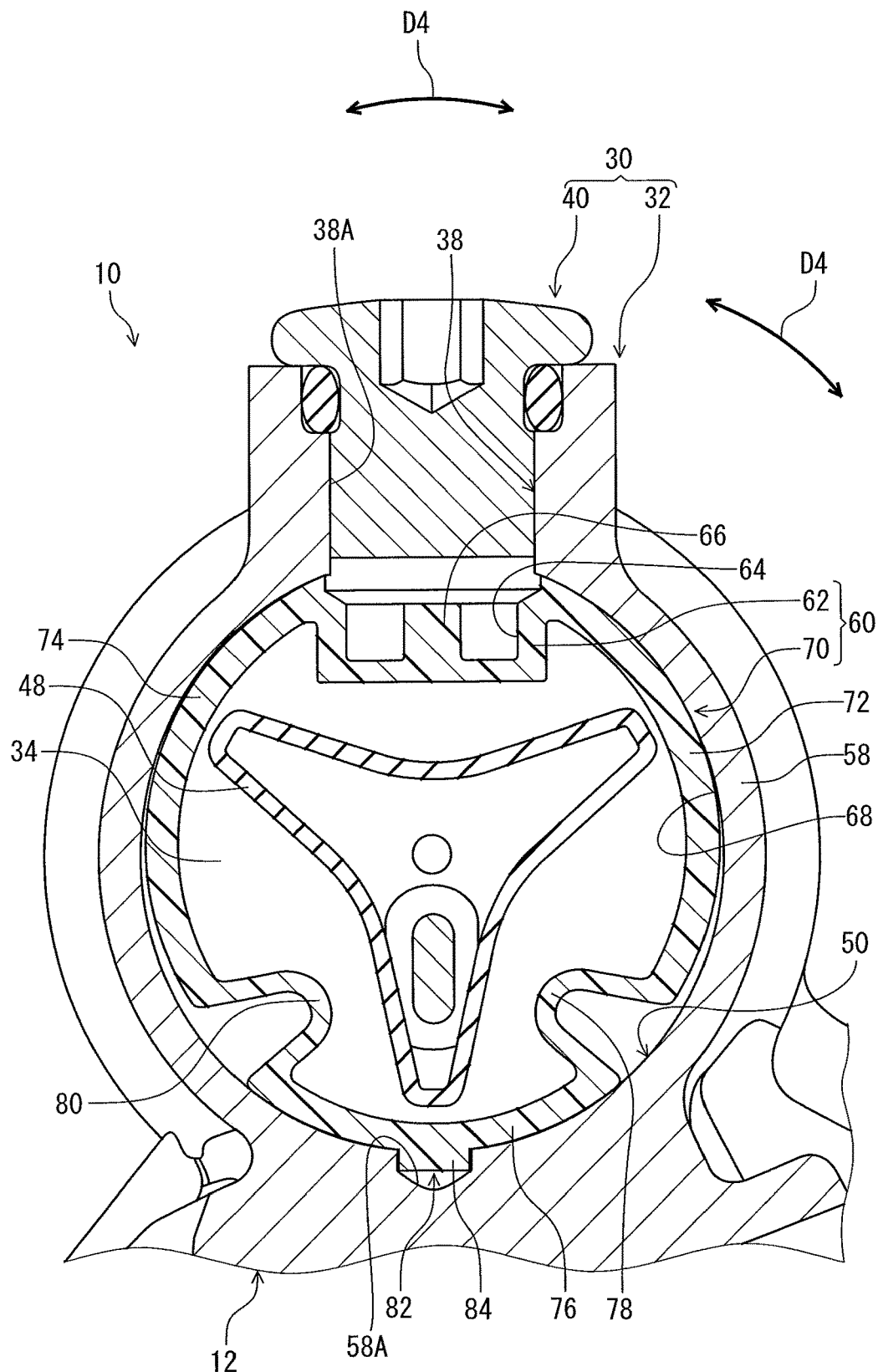
FIG. 9 is a cross-sectional view of the operating device taken along line IX-IX of FIG. 5.

As seen in FIG. 9, the reservoir body 58 includes an inner peripheral surface 68. The inner peripheral surface 68 at least partially defines the reservoir space 50. The attachment body 60 includes a second attachment portion 70. The second attachment portion 70 extends from the first attachment portion 62 along the inner peripheral surface 68 in the attachment state. The first attachment portion 62 and the second attachment portion 70 define an annular shape. The second attachment portion 70 is deformable to bias the first attachment portion 62 toward the bleeding port 38 in the attachment state.

Figure 10:
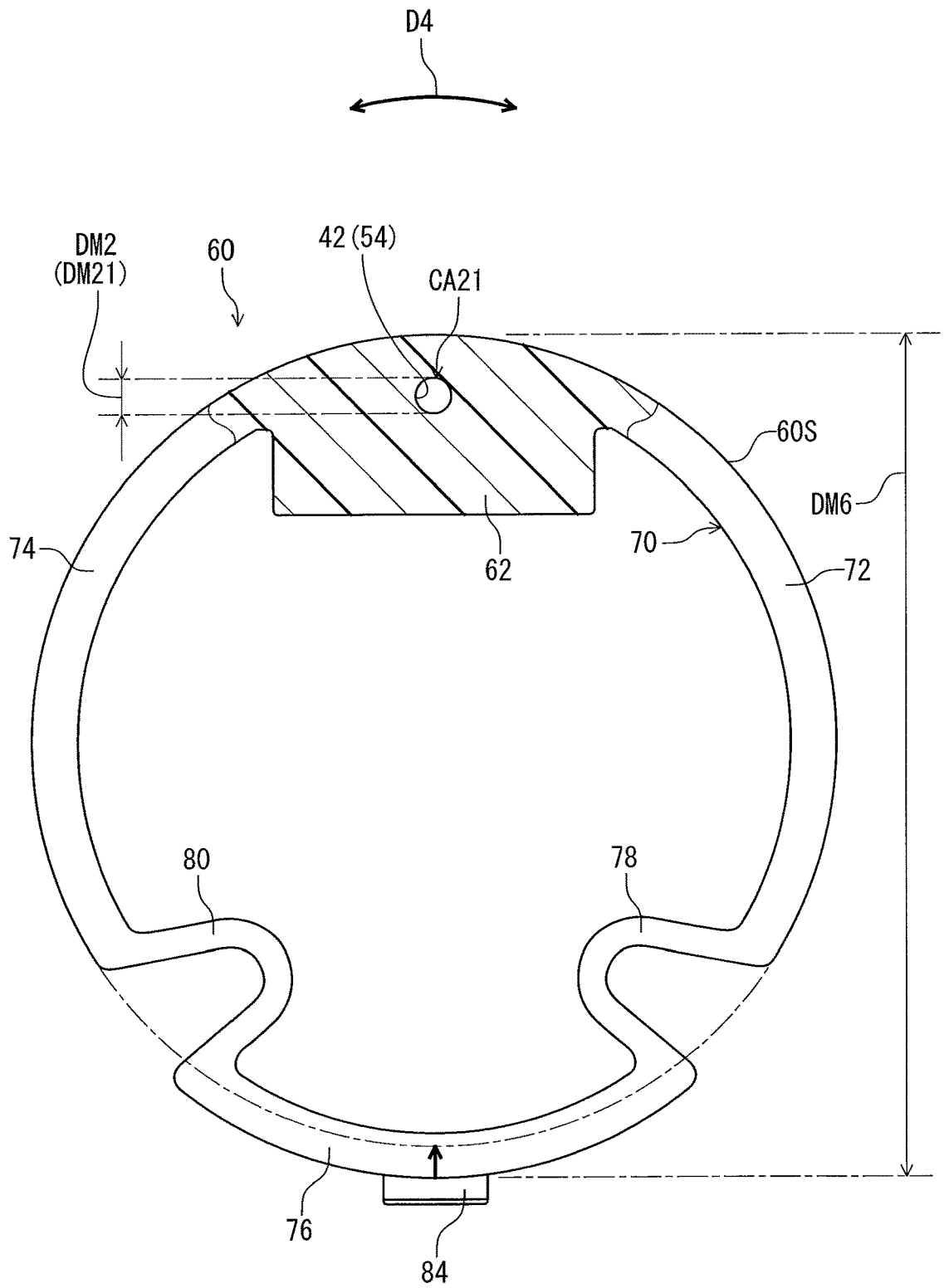
FIG. 10 is a side elevational view of the attachment body illustrated in FIG. 7.

As seen in FIG. 10, the attachment body 60 has an outer diameter DM6 in a free state. The second attachment portion 70 is deformable to decrease the outer diameter DM6 in the attachment state. The outer diameter DM6 is defined as a maximum outer diameter of the first attachment portion 62 and the second attachment portion 70. The attachment body 60 includes an outer peripheral surface 60S extending in a circumferential direction D4. The outer peripheral surface 60S defines the outer diameter DM6.

The second attachment portion 70 includes a first extending part 72, a second extending part 74, a third extending part 76, a first curved part 78, and a second curved part 80. The outer peripheral surface 60S is provided on the first extending part 72, the second extending part 74, and the third extending part 76. The first extending part 72 circumferentially extends from the first attachment portion 62. The second extending part 74 circumferentially extends from the first attachment portion 62. The first attachment portion 62 is provided between the first extending part 72 and the second extending part 74 in the circumferential direction D4. The third extending part 76 circumferentially extends and is provided between the first extending part 72 and the second extending part 74 in the circumferential direction D4.

The first curved part 78 couples the first extending part 72 and the third extending part 76. The first curved part 78 is provided between the first extending part 72 and the third extending part 76 in the circumferential direction D4. The first curved part 78 extends radially inwardly from the first extending part 72 and the third extending part 76.

The second curved part 80 couples the second extending part 74 and the third extending part 76. The second curved part 80 is provided between the second extending part 74 and the third extending part 76 in the circumferential direction D4. The second curved part 80 extends radially inwardly from the second extending part 74 and the third extending part 76.

The first curved part 78 is deformable to decrease the outer diameter DM6 in the attachment state. The second curved part 80 is deformable to decrease the outer diameter DM6 in the attachment state. Thus, the first curved part 78 is deformable to bias the first attachment portion 62 toward the bleeding port 38 (see e.g., FIG. 9) in the attachment state. The second curved part 80 is deformable to bias the first attachment portion 62 toward the bleeding port 38 (see e.g., FIG. 9) in the attachment state.

As seen in FIG. 5, the attachment body 60 includes a positioning portion 82. The positioning portion 82 is configured to position the attachment body 60 relative to the reservoir body 58 in the attachment state.

The positioning portion 82 includes a positioning protrusion 84. The positioning protrusion 84 protrudes radially from the second attachment portion 70 with respect to the longitudinal axis A3 in the attachment state. The positioning protrusion 84 protrudes radially outwardly from the second attachment portion 70 in the attachment state. The reservoir body 58 includes a positioning recess 58A. The positioning protrusion 84 is configured to be at least partially provided in the positioning recess 58A in the attachment state. The positioning protrusion 84 is configured to position the attachment body 60 relative to the reservoir body 58 in the longitudinal direction D3 in the attachment state.

As seen in FIG. 9, the positioning protrusion 84 is configured to position the attachment body 60 relative to the reservoir body 58 in the circumferential direction D4 in the attachment state.

As seen in FIG. 10, the positioning protrusion 84 protrudes radially outwardly from the third extending part 76. The positioning protrusion 84 protrudes radially outwardly from the second attachment portion 70 away from the first attachment portion 62. However, the positioning protrusion 84 can be arranged to protrude radially outwardly from at least one of the first attachment portion 62, the first extending part 72, the second extending part 74, and the third extending part 76 if needed and/or desired.

As seen in FIG. 5, the attachment body 60 includes a first axial end 60A and a second axial end 60B. The attachment body 60 extends between the first axial end 60A and the second axial end 60B along the longitudinal axis A3 in the attachment state. A first distance DS1 is defined between the first axial end 60A and the positioning protrusion 84. A second distance DS2 is defined between the second axial end 60B and the positioning protrusion 84. The second distance DS2 is different from the first distance DS1. The second distance DS2 is longer than the first distance DS1. However, the second distance DS2 can be shorter than or equal to the first distance DS1 if needed and/or desired.

The positioning portion 82 includes the first axial end 60A. The first axial end 60A is configured to contact the reservoir body 58 in the longitudinal direction D3 in the attachment state. The reservoir body 58 includes a positioning surface 58B facing in the longitudinal direction D3. The first axial end 60A is configured to contact the positioning surface 58B in the longitudinal direction D3 in the attachment state. The first axial end 60A is configured to position the attachment body 60 relative to the reservoir body 58 in the longitudinal direction D3 in the attachment state.

Figure 11:
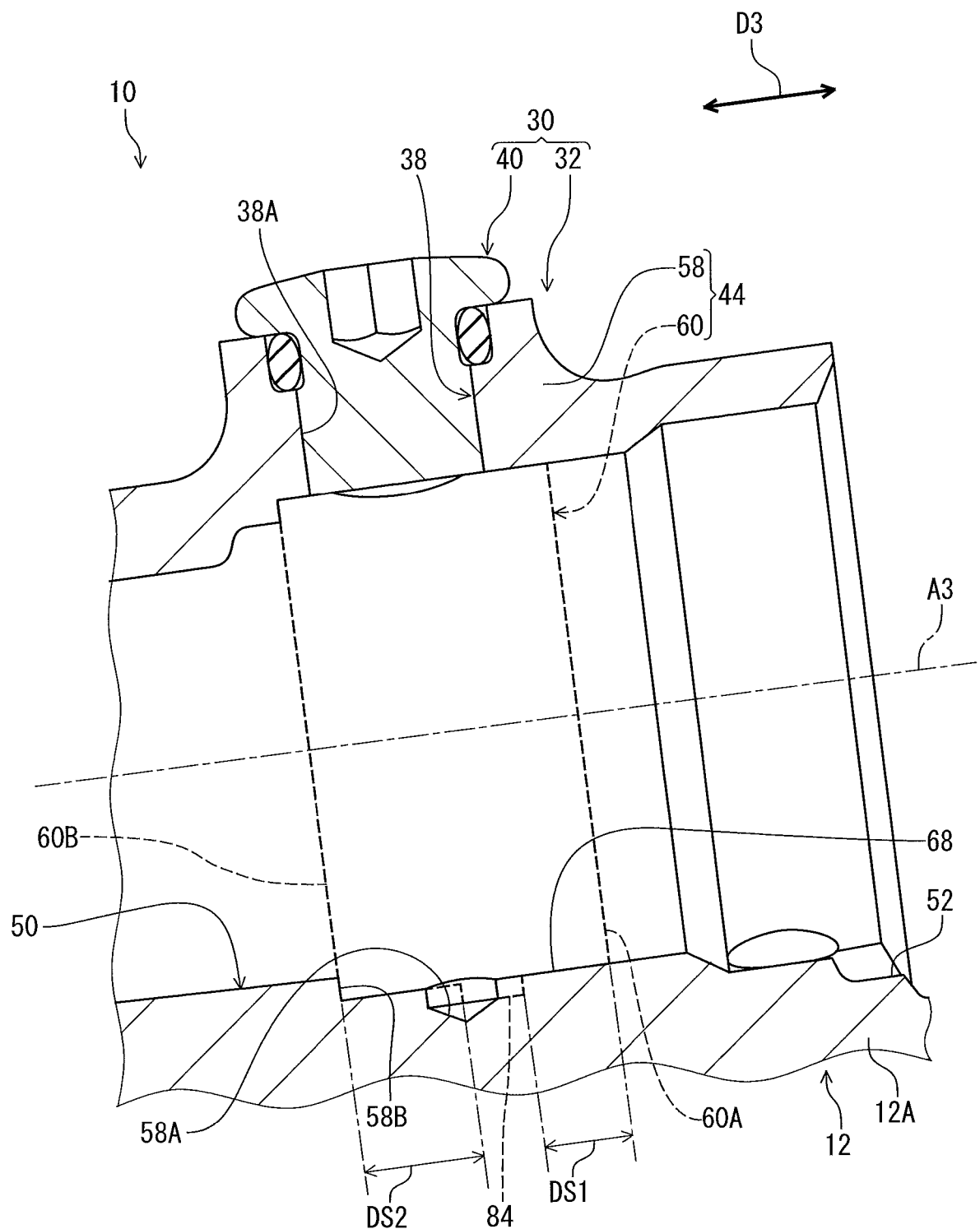
FIG. 11 is a partial cross-sectional view of the operating device illustrated in FIG. 3, with the attachment body, a lid, and a diaphragm omitted.

As seen in FIG. 11, the first distance DS1 and the second distance DS2 restrict the attachment body 60 from being attached to the reservoir body 58 in a wrong orientation in which the second axial end 60B of the attachment body 60 is in contact with the positioning surface 58B. The first distance DS1 and the second distance DS2 enable the attachment body 60 to be necessarily attached to the reservoir body 58 in a correct orientation in which the first axial end 60A of the attachment body 60 is in contact with the positioning surface 58B. As seen in FIG. 3, in the correct orientation, the first intermediate hole 54 is closer to the connecting port 36 than the second intermediate hole 56 in the longitudinal direction D3. However, the attachment body 60 can be configured to be attached to the reservoir body 58 in each of the orientations if needed and/or desired. In such embodiments, the first distance DS1 can be equal to the second distance DS2.

As seen in FIG. 5, the bleeding port 38 has a bleeding-port inner diameter DM1. The intermediate port 42 has an intermediate-port inner diameter DM2. The first intermediate hole 54 has a first intermediate-hole inner diameter DM21. The second intermediate hole 56 has a second intermediate-hole inner diameter DM22. The intermediate-port inner diameter DM2 of the intermediate port 42 can be defined as the first intermediate-hole inner diameter DM21 or as the second intermediate-hole inner diameter DM22.

The intermediate-port inner diameter DM2 is smaller than the bleeding-port inner diameter DM1. The first intermediate-hole inner diameter DM21 is smaller than the bleeding-port inner diameter DM1. The second intermediate-hole inner diameter DM22 is smaller than the bleeding-port inner diameter DM1.

The first intermediate-hole inner diameter DM21 is different from the second intermediate-hole inner diameter DM22. In the present embodiment, the first intermediate-hole inner diameter DM21 is larger than the second intermediate-hole inner diameter DM22. However, the first intermediate-hole inner diameter DM21 can be smaller than or equal to the second intermediate-hole inner diameter DM22 if needed and/or desired.

Figure 12:
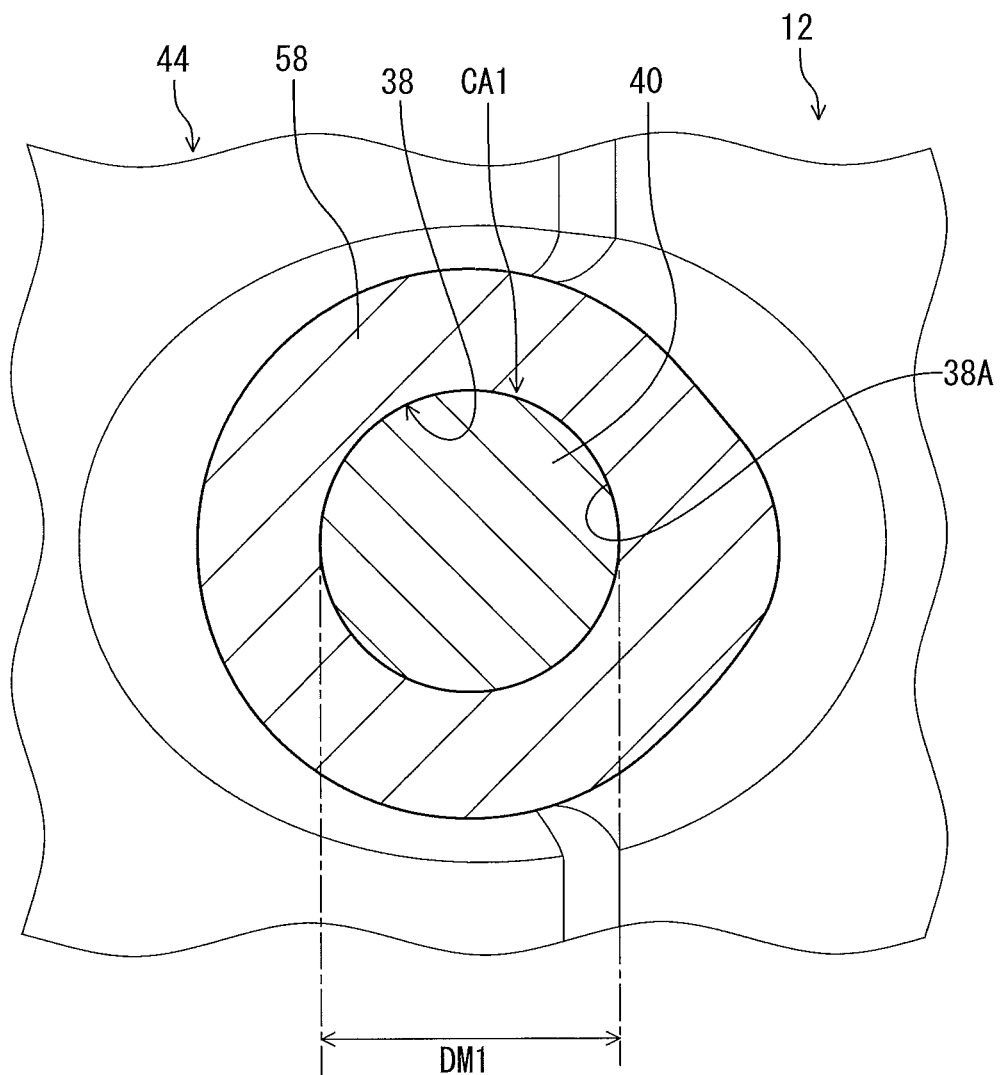
FIG. 12 is a cross-sectional view of the operating device taken along line XII-XII of FIG. 5.

As seen in FIG. 12, the bleeding port 38 has a bleeding-port cross-sectional area CA1. For example, the bleeding-port cross-sectional area CA1 can be calculated based on the bleeding-port inner diameter DM1.

Figure 13:
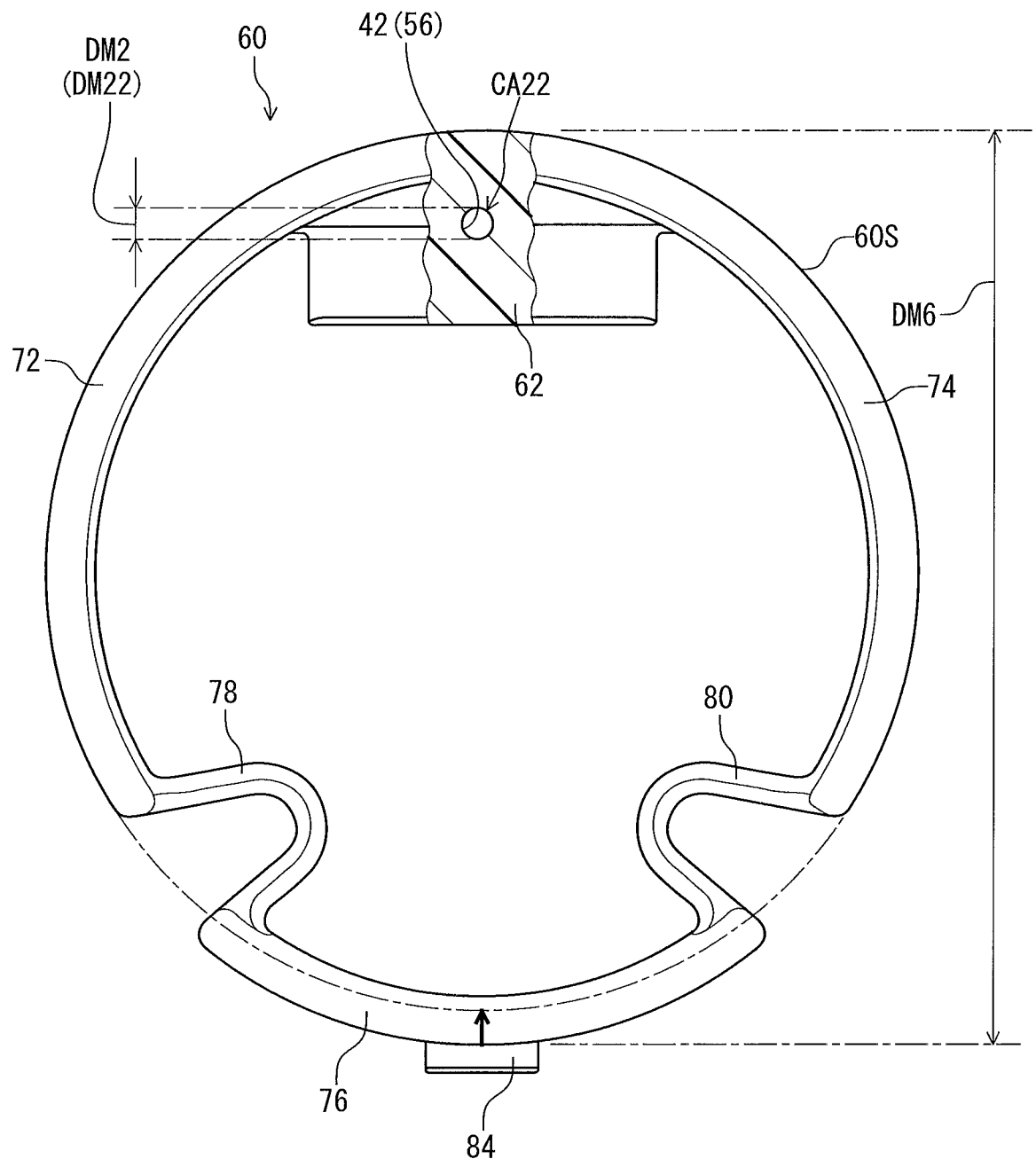
FIG. 13 is another side elevational view of the attachment body illustrated in FIG. 7.

As seen in FIGS. 10 and 13, the intermediate port 42 has an intermediate-port cross-sectional area CA2. As seen in FIG. 10, the first intermediate hole 54 has a first intermediate-hole cross-sectional area CA21. For example, the first intermediate-hole cross-sectional area CA21 can be calculated based on the first intermediate-hole inner diameter DM21. As seen in FIG. 13, the second intermediate hole 56 has a second intermediate-hole cross-sectional area CA22. For example, the second intermediate-hole cross-sectional area CA22 can be calculated based on the second intermediate-hole inner diameter DM22.

As seen in FIGS. 10, 12, and 13, the intermediate-port cross-sectional area CA2 is smaller than the bleeding-port cross-sectional area CA1. The first intermediate-port cross-sectional area CA21 is smaller than the bleeding-port cross-sectional area CA1. The second intermediate-port cross-sectional area CA22 is smaller than the bleeding-port cross-sectional area CA1. The intermediate-port cross-sectional area CA2 is a total of the first intermediate-hole cross-sectional area CA21 and the second intermediate-hole cross-sectional area CA22. Thus, the total of the first intermediate-hole cross-sectional area CA21 and the second intermediate-hole cross-sectional area CA22 is smaller than the bleeding-port cross-sectional area CA1.

Figure 14:
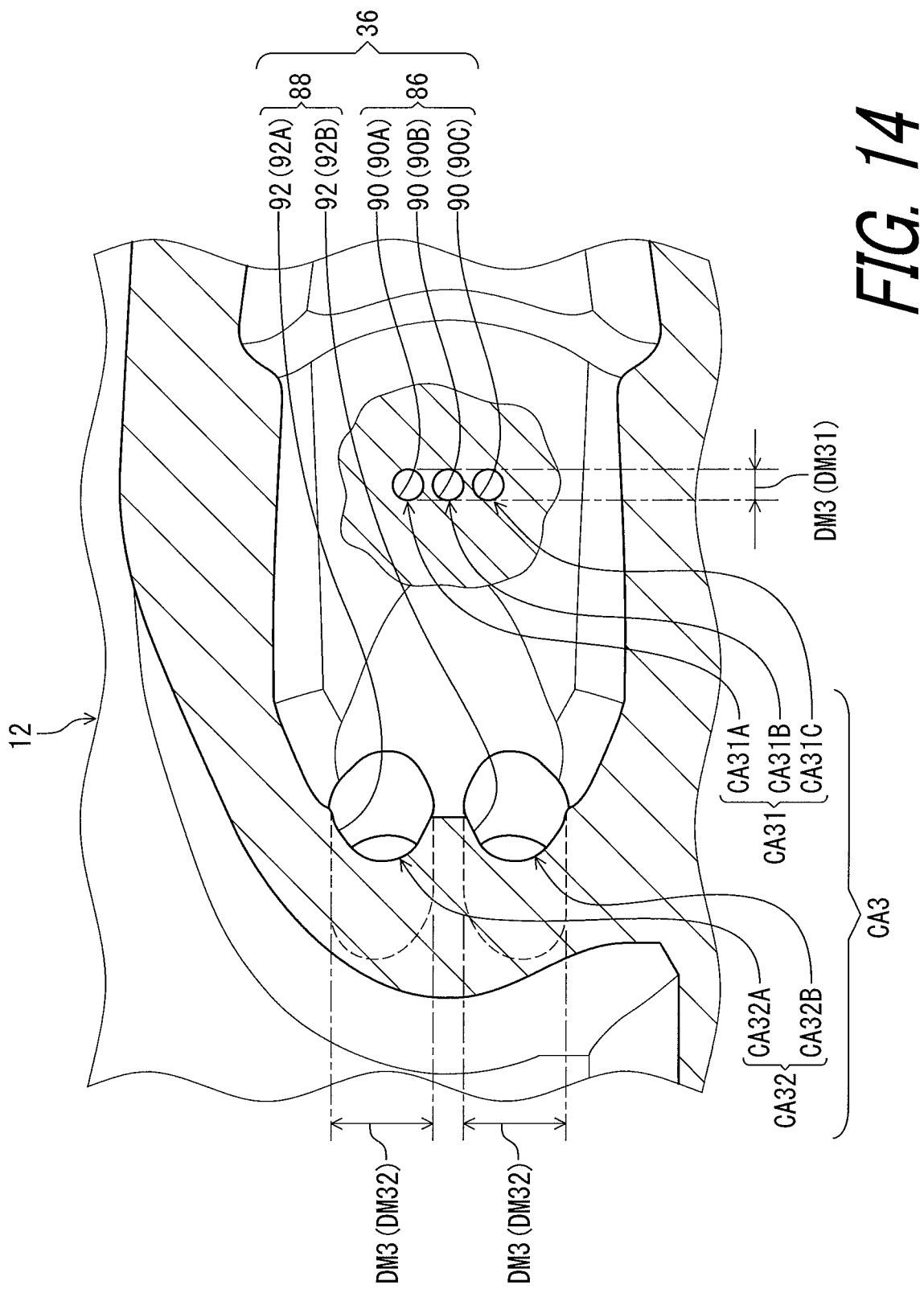
FIG. 14 is a cross-sectional view of the operating device taken along line XIV-XIV of FIG. 16.

As seen in FIG. 14, the connecting port 36 includes a first connecting port 86. The connecting port 36 includes a second connecting port 88. The second connecting port 88 is spaced apart from the first connecting port 86.

The first connecting port 86 includes at least one first connecting hole 90. In the present embodiment, the first connecting port 86 includes at least two first connecting holes 90 (e.g., the first connecting holes 90A, 90B, and 90C). In the present embodiment, a total number of the first connecting holes 90 is three. However, the total number of the first connecting hole 90 is not limited to three.

The second connecting port 88 includes at least one second connecting hole 92. In the present embodiment, the second connecting port 88 includes at least two second connecting holes 92 (e.g., the second connecting holes 92A and 92B). In the present embodiment, a total number of the second connecting holes 92 is two. However, the total number of the second connecting hole 92 is not limited to two.

The connecting port 36 has a connecting-port inner diameter DM3. The first connecting port 86 has a first connecting-port inner diameter DM31. The second connecting port 88 has a second connecting-port inner diameter DM32. The first connecting-port inner diameter DM31 is defined as the connecting-port inner diameter DM3 of the connecting port 36. The second connecting-port inner diameter DM32 is defined as the connecting-port inner diameter DM3 of the connecting port 36. The second connecting-port inner diameter DM32 can also be referred to as a connecting-port inner diameter DM32. Thus, the second connecting port 88 has the connecting-port inner diameter DM32.

The first connecting hole 90 (e.g., the first connecting holes 90A, 90B, and 90C) has the first connecting-port inner diameter DM31. The second connecting hole 92 (e.g., the second connecting holes 92A and 92B) has the second connecting-port inner diameter DM32. In the present embodiment, one of the first connecting-port inner diameters DM31 is equal to another of the first connecting-port inner diameters DM31. One of the second connecting-port inner diameters DM32 is equal to another of the second connecting-port inner diameters DM32. The first connecting-port inner diameter DM31 is different from the second connecting-port inner diameter DM32. The first connecting-port inner diameter DM31 is smaller than the second connecting-port inner diameter DM32. However, the first connecting-port inner diameter DM31 can be larger than or equal to the second connecting-port inner diameter DM32 if needed and/or desired. One of the first connecting-port inner diameters DM31 can be different from another of the first connecting-port inner diameters DM31 if needed and/or desired. One of the second connecting-port inner diameters DM32 can be different from another of the second connecting-port inner diameters DM32 if needed and/or desired.

As seen in FIG. 3, the intermediate-port inner diameter DM2 is smaller than the connecting-port inner diameter DM32. The first intermediate-hole inner diameter DM21 is smaller than the connecting-port inner diameter DM32. The second intermediate-hole inner diameter DM22 is smaller than the connecting-port inner diameter DM32.

The first connecting port 86 is at least partially provided closer to the intermediate port 42 than the second connecting port 88 in the longitudinal direction D3 defined along the longitudinal axis A3. However, the second connecting port 88 can be provided closer to the intermediate port 42 than the first connecting port 86 in the longitudinal direction D3 if needed and/or desired.

Figure 15:
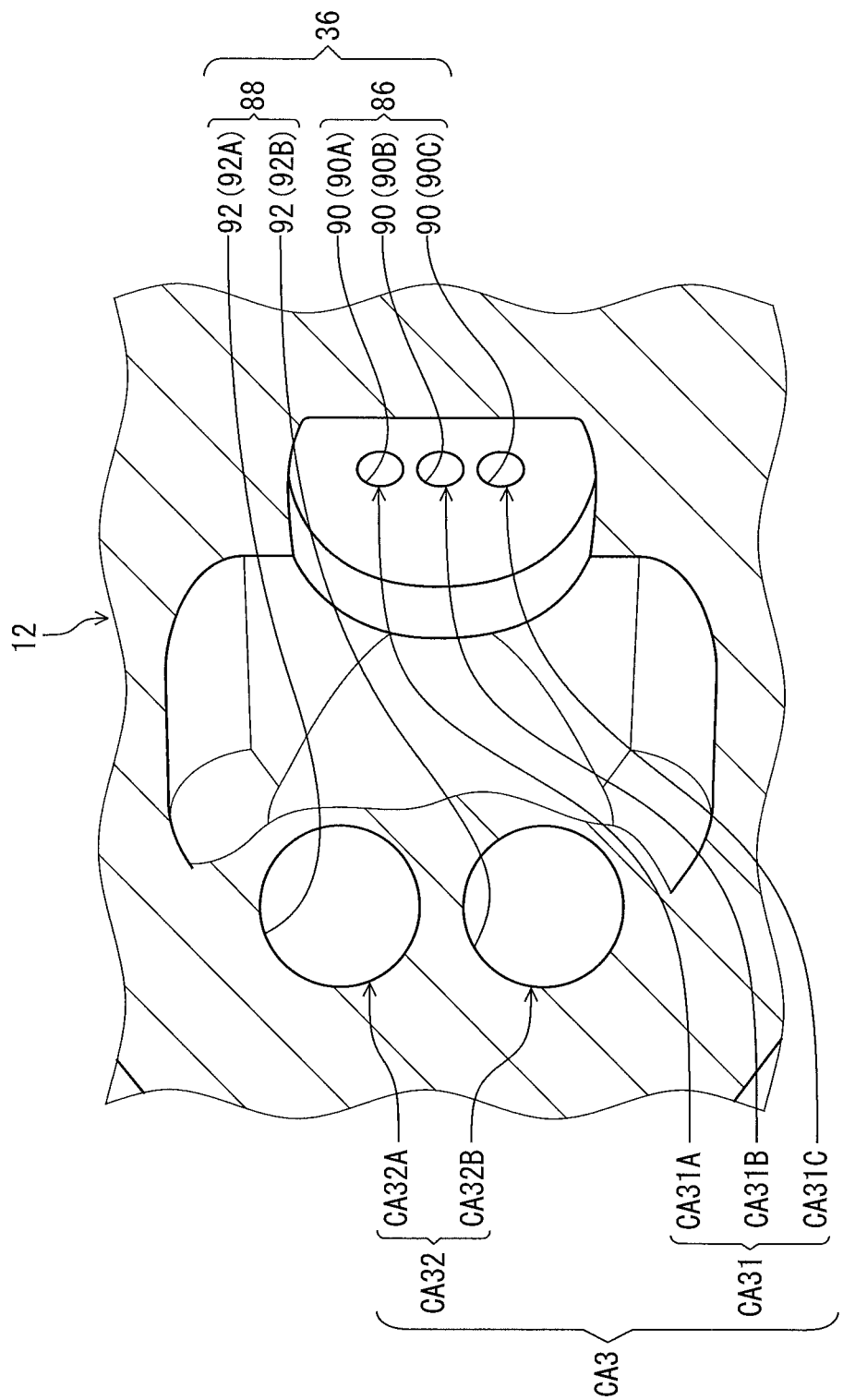
FIG. 15 is a cross-sectional view of the operating device taken along line XV-XV of FIG. 16.

As seen in FIGS. 14 and 15, the connecting port 36 has a connecting-port cross-sectional area CA3. As seen in FIG. 14, the first connecting port 86 has a first connecting-port cross-sectional area CA31. As seen in FIG. 15, the second connecting port 88 has a second connecting-port cross-sectional area CA32. The connecting-port cross-sectional area CA3 is a total of the first connecting-port cross-sectional area CA31 and the second connecting-port cross-sectional area CA32.

As seen in FIG. 14, the first connecting hole 90A has a first connecting-hole cross-sectional area CA31A. The first connecting hole 90B has a first connecting-hole cross-sectional area CA31B. The first connecting hole 90C has a first connecting-hole cross-sectional area CA31C. Each of the first connecting-hole cross-sectional areas CA31A, CA31B, and CA31C can be calculated based on the first connecting-port inner diameter DM31. The first connecting-port cross-sectional area CA31 is a total of the first connecting-hole cross-sectional areas CA31A, CA31B, and CA31C.

As seen in FIG. 15, the second connecting hole 92A has a second connecting-hole cross-sectional area CA32A. The second connecting hole 92B has a second connecting-hole cross-sectional area CA32B. Each of the second connecting-hole cross-sectional areas CA32A and CA32B can be calculated based on the second connecting-port inner diameter DM32. The second connecting-port cross-sectional area CA32 is a total of the second connecting-hole cross-sectional areas CA32A and CA32B. Thus, the connecting-port cross-sectional area CA3 is a total of the first connecting-hole cross-sectional areas CA31A, CA31B, and CA31C and the second connecting-hole cross-sectional areas CA32A and CA32B.

As seen in FIGS. 3, 10, and 13 to 15, the intermediate-port cross-sectional area CA2 is smaller than the connecting-port cross-sectional area CA3. The total of the first intermediate-hole cross-sectional area CA21 and the second intermediate-hole cross-sectional area CA22 is smaller than the total of the first connecting-port cross-sectional area CA31 and the second connecting-port cross-sectional area CA32. The total of the first intermediate-hole cross-sectional area CA21 and the second intermediate-hole cross-sectional area CA22 is smaller than the total of the first connecting-hole cross-sectional areas CA31A, CA31B, and CA31C and the second connecting-hole cross-sectional areas CA32A and CA32B.

The intermediate-port cross-sectional area CA2 is smaller than the first connecting-port cross-sectional area CA31. The total of the first intermediate-hole cross-sectional area CA21 and the second intermediate-hole cross-sectional area CA22 is smaller than the total of the first connecting-hole cross-sectional areas CA31A, CA31B, and CA31C. However, the relationship between the intermediate-port cross-sectional area CA2 and the first connecting-port cross-sectional area CA31 is not limited to the above relationship.

The intermediate-port cross-sectional area CA2 is smaller than the second connecting-port cross-sectional area CA32. The total of the first intermediate-hole cross-sectional area CA21 and the second intermediate-hole cross-sectional area CA22 is smaller than the total of the second connecting-hole cross-sectional areas CA32A and CA32B. However, the relationship between the intermediate-port cross-sectional area CA2 and the second connecting-port cross-sectional area CA32 is not limited to the above relationship.

Figure 16:
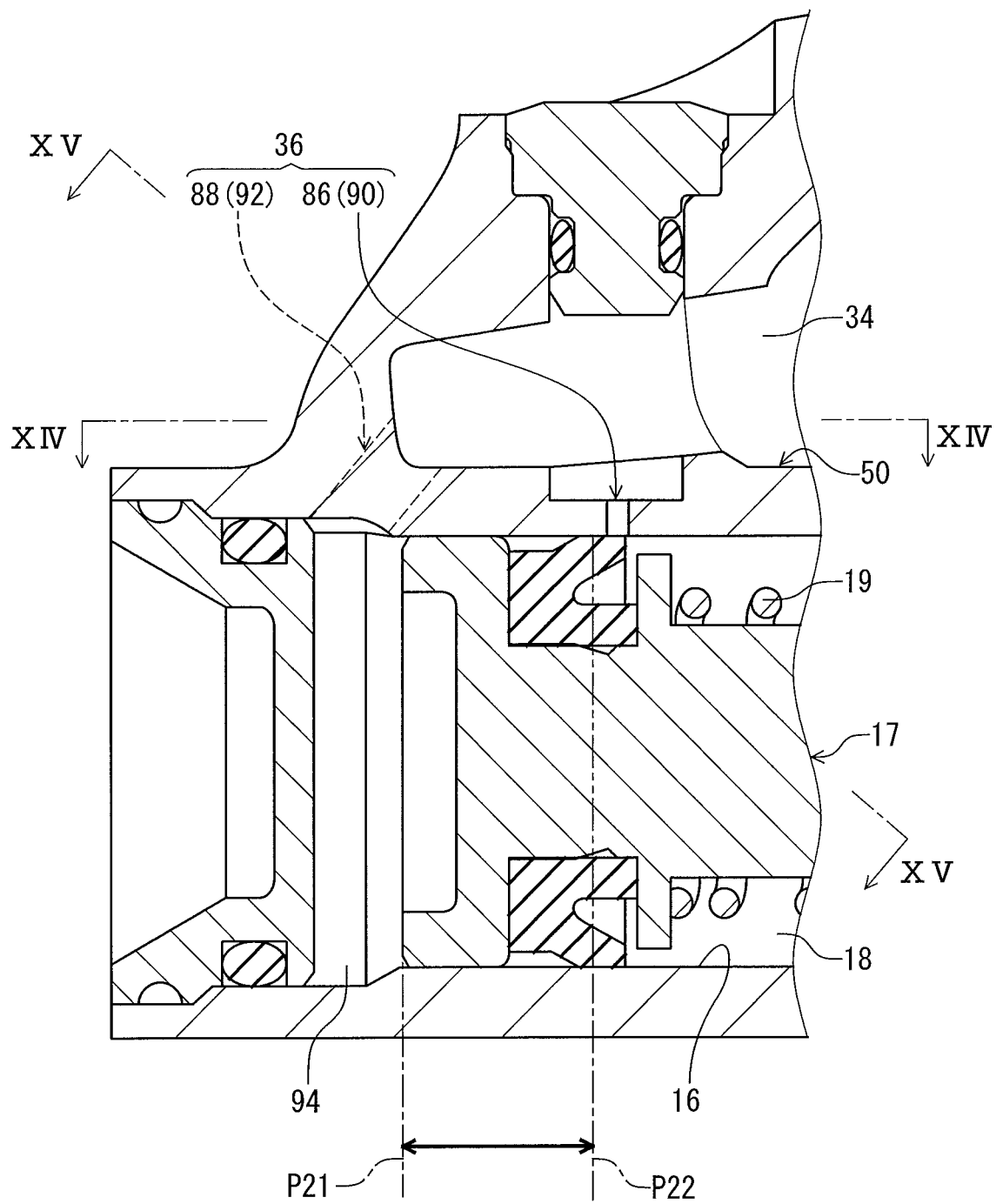
FIG. 16 is a partial cross-sectional view of the operating device illustrated in FIG. 3.

As seen in FIG. 16, the reservoir chamber 34 is configured to be in communication with the hydraulic chamber 18 via the first connecting port 86. The reservoir chamber 34 is configured to be in communication with the hydraulic chamber 18 via the first connecting holes 90 (e.g., the first connecting holes 90A, 90B, and 90C depicted in FIG. 14). The reservoir chamber 34 is configured to be in communication with the hydraulic chamber 18 via the first connecting port 86 in an initial state where the piston 17 is in the initial position P21. The reservoir chamber 34 is configured not to be in communication with the hydraulic chamber 18 via the first connecting port 86 in an actuated state where the piston 17 is moved from the initial position P21 toward the actuated position P22. The reservoir chamber 34 is configured to be in communication with the additional chamber 37 via the first connecting port 86 in the actuated state where the piston 17 is moved from the initial position P21 toward the actuated position P22.

The reservoir chamber 34 is configured to be in communication with the additional chamber 37 via the second connecting port 88. The reservoir chamber 34 is configured to be in communication with the additional chamber 37 via the second connecting holes 92 (e.g., the second connecting holes 92A and 92B depicted in FIG. 14). The fluid flows between the reservoir chamber 34 and the additional chamber 37 via the second connecting port 88 in each of the initial state and the actuated state.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic reservoir of a human-powered vehicle, comprising:
   a reservoir structure including:
      a reservoir chamber;
      a bleeding port configured to be in communication with the reservoir chamber;
      a connecting port configured to connect the reservoir chamber and a hydraulic chamber, the hydraulic chamber being at least partially defined by a piston; and
      an intermediate port through which a fluid is to flow from the connecting port to the bleeding port when bleeding the hydraulic reservoir; and
   a bleeding plug configured to be attached to the bleeding port, wherein
   the bleeding port has a bleeding-port cross-sectional area,
   the intermediate port includes a first intermediate hole and a second intermediate hole,
   the first intermediate hole has a first intermediate-hole cross-sectional area,
   the second intermediate hole has a second intermediate-hole cross-sectional area, and
   a total of the first intermediate-hole cross-sectional area and the second intermediate-hole cross-sectional area is smaller than the bleeding-port cross-sectional area.

2. The hydraulic reservoir according to claim 1, wherein the intermediate port has an intermediate-port cross-sectional area, and
   the intermediate-port cross-sectional area is smaller than the bleeding-port cross-sectional area.

3. The hydraulic reservoir according to claim 1, wherein the reservoir chamber has a longitudinal axis and extends along the longitudinal axis, and
   the intermediate port is at least partially provided between the bleeding port and the connecting port in a longitudinal direction defined along the longitudinal axis.

4. The hydraulic reservoir according to claim 1, wherein the bleeding port is configured to be in communication with the reservoir chamber via the intermediate port.

5. The hydraulic reservoir according to claim 1, wherein the reservoir structure includes a reservoir housing including a reservoir space having an end opening, a lid configured to be attached to the reservoir housing to close the end opening of the reservoir space, and a diaphragm configured to be attached to the lid, the diaphragm being configured to be provided in the reservoir space in an assembled state where the lid is attached to the reservoir housing and where the diaphragm is attached to the lid, the reservoir housing and the diaphragm define the reservoir chamber in the reservoir space, and the reservoir housing includes the bleeding port, the connecting port, and the intermediate port.

6. The hydraulic reservoir according to claim 5, wherein
the reservoir housing includes a reservoir body and an attachment body,
the reservoir body includes the bleeding port and the connecting port,
the attachment body is configured to be attached to the reservoir body, and
the attachment body includes the intermediate port.

7. The hydraulic reservoir according to claim 6, wherein
the attachment body is configured to be at least partially provided in the reservoir space.

8. The hydraulic reservoir according to claim 6, wherein
the attachment body includes a first attachment portion,
the first attachment portion includes the intermediate port and an intermediate space, and
the intermediate port is in communication with the intermediate space.

9. The hydraulic reservoir according to claim 8, wherein
the attachment body includes a protruding part provided in the intermediate space, and
the protruding part is configured to be at least partially provided in an inlet opening of a funnel in a state where the funnel is attached to the bleeding port instead of the bleeding plug.

10. The hydraulic reservoir according to claim 8, wherein
the intermediate space is configured to be at least partially provided between the bleeding port and the intermediate port in an attachment state where the attachment body is attached to the reservoir body.

11. The hydraulic reservoir according to claim 10, wherein
the reservoir body includes an inner peripheral surface at least partially defining the reservoir space,
the attachment body includes a second attachment portion, and
the second attachment portion extends from the first attachment portion along the inner peripheral surface in the attachment state.

12. The hydraulic reservoir according to claim 11, wherein
the first attachment portion and the second attachment portion define an annular shape.

13. The hydraulic reservoir according to claim 11, wherein
the second attachment portion is deformable to bias the first attachment portion toward the bleeding port in the attachment state.

14. The hydraulic reservoir according to claim 11, wherein
the attachment body has an outer diameter in a free state, and
the second attachment portion is deformable to decrease the outer diameter in the attachment state.

15. The hydraulic reservoir according to claim 11, wherein
the attachment body includes a positioning portion configured to position the attachment body relative to the reservoir body in the attachment state.

16. The hydraulic reservoir according to claim 15, wherein
the reservoir chamber has a longitudinal axis and extends along the longitudinal axis, and
the positioning portion includes a positioning protrusion protruding radially from the second attachment portion with respect to the longitudinal axis in the attachment state.

17. The hydraulic reservoir according to claim 16, wherein
the attachment body includes a first axial end and a second axial end,
the attachment body extends between the first axial end and the second axial end along the longitudinal axis in the attachment state,
a first distance is defined between the first axial end and the positioning protrusion,
a second distance is defined between the second axial end and the positioning protrusion, and
the second distance is different from the first distance.

18. An operating device of a human-powered vehicle, comprising:
a base member including a hole;
an operating member movably coupled to the base member;
a piston movably provided in the hole, the piston being coupled to the operating member to be moved relative to the base member in response to a movement of the operating member, the base member and the piston defining a hydraulic chamber in the hole; and
the hydraulic reservoir according to claim 1, the hydraulic reservoir being attached to the base member, the reservoir chamber of the hydraulic reservoir being configured to be in communication with the hydraulic chamber via the connecting port.

19. A hydraulic reservoir of a human-powered vehicle, comprising:
a reservoir structure including:
a reservoir chamber;
a bleeding port configured to be in communication with the reservoir chamber, the bleeding port having a bleeding-port inner diameter;
a connecting port configured to connect the reservoir chamber and a hydraulic chamber, the hydraulic chamber being at least partially defined by a piston; and
an intermediate port through which a fluid is to flow from the connecting port to the bleeding port when bleeding the hydraulic reservoir; and
a bleeding plug configured to be attached to the bleeding port, wherein
the intermediate port includes a first intermediate hole,
the first intermediate hole has a first intermediate-hole inner diameter,
the first intermediate-hole inner diameter is smaller than the bleeding-port inner diameter, and
the intermediate port includes a second intermediate hole spaced apart from the first intermediate hole.

20. The hydraulic reservoir according to claim 19, wherein
the second intermediate hole has a second intermediate-hole inner diameter, and the second intermediate-hole inner diameter is smaller than the bleeding-port inner diameter.

21. The hydraulic reservoir according to claim 20, wherein
the first intermediate-hole inner diameter is different from the second intermediate-hole inner diameter.

22. The hydraulic reservoir according to claim 20, wherein
the first intermediate-hole inner diameter is larger than the second intermediate-hole inner diameter.

23. The hydraulic reservoir according to claim 19, wherein
the reservoir chamber has a longitudinal axis and extends along the longitudinal axis, and
the first intermediate hole is at least partially provided closer to the connecting port than the second intermediate hole in a longitudinal direction defined along the longitudinal axis.

24. The hydraulic reservoir according to claim 19, wherein
the reservoir chamber has a longitudinal axis and extends along the longitudinal axis, and
the bleeding port is at least partially provided between the first intermediate hole and the second intermediate hole in a longitudinal direction defined along the longitudinal axis.

25. A hydraulic reservoir of a human-powered vehicle, comprising:
a reservoir structure including:
a reservoir chamber;
a bleeding port configured to be in communication with the reservoir chamber;
a connecting port configured to connect the reservoir chamber and a hydraulic chamber, the hydraulic chamber being at least partially defined by a piston; and
an intermediate port through which a fluid is to flow from the connecting port to the bleeding port when bleeding the hydraulic reservoir; and
a bleeding plug configured to be attached to the bleeding port, wherein
the intermediate port has an intermediate-port cross-sectional area,
the connecting port has a connecting-port cross-sectional area, and
the intermediate-port cross-sectional area is smaller than the connecting-port cross-sectional area.

26. The hydraulic reservoir according to claim 25, wherein
the connecting port includes a first connecting port,
the first connecting port has a first connecting-port cross-sectional area, and
the intermediate-port cross-sectional area is smaller than the first connecting-port cross-sectional area.

27. The hydraulic reservoir according to claim 26, wherein
the connecting port includes a second connecting port spaced apart from the first connecting port.

28. The hydraulic reservoir according to claim 27, wherein
the second connecting port has a second connecting-port cross-sectional area, and
the intermediate-port cross-sectional area is smaller than a total of the first connecting-port cross-sectional area and the second connecting-port cross-sectional area.

29. The hydraulic reservoir according to claim 27, wherein
the second connecting port has a second connecting-port cross-sectional area, and
the intermediate-port cross-sectional area is smaller than the second connecting-port cross-sectional area.

30. The hydraulic reservoir according to claim 27, wherein
the reservoir chamber has a longitudinal axis and extends along the longitudinal axis, and
the first connecting port is at least partially provided closer to the intermediate port than the second connecting port in a longitudinal direction defined along the longitudinal axis.

\* \* \* \* \*